United States Patent
Van der Auwera et al.

(10) Patent No.: US 12,118,758 B2
(45) Date of Patent: Oct. 15, 2024

(54) PLANAR AND AZIMUTHAL MODE IN GEOMETRIC POINT CLOUD COMPRESSION

(71) Applicant: QUALCOMM Incorporated, San Diego, CA (US)

(72) Inventors: Geert Van der Auwera, Del Mar, CA (US); Bappaditya Ray, San Diego, CA (US); Adarsh Krishnan Ramasubramonian, Irvine, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 148 days.

(21) Appl. No.: 17/350,603

(22) Filed: Jun. 17, 2021

(65) Prior Publication Data
US 2021/0407143 A1     Dec. 30, 2021

Related U.S. Application Data

(60) Provisional application No. 63/046,512, filed on Jun. 30, 2020, provisional application No. 63/042,432, filed on Jun. 22, 2020.

(51) Int. Cl.
*G06T 17/20* (2006.01)
*G01S 17/89* (2020.01)
*G06T 9/00* (2006.01)

(52) U.S. Cl.
CPC .............. *G06T 9/001* (2013.01); *G01S 17/89* (2013.01); *G06T 17/20* (2013.01)

(58) Field of Classification Search
CPC ................................ G01S 17/89; G06T 17/20
See application file for complete search history.

(56) References Cited

U.S. PATENT DOCUMENTS

| 10,693,492 B1 | 6/2020 | Lasserre et al. |
| 2011/0115812 A1* | 5/2011 | Minear ................ G09G 5/02 345/593 |

(Continued)

OTHER PUBLICATIONS

Auwera G.V.D., et al., "[GPCC] [New] Planar and Azimuthal Coding Mode Simplifications", 131. MPEG Meeting, Jun. 29, 2020-Jul. 3, 2020, Online, (Motion Picture Expert Group or ISO/IEC JTC1/SC29/WG11), No. m54694, Jul. 1, 2020 (Jul. 1, 2020), XP030289263, 7 Pages, Retrieved from the Internet: URL: http://phenix.int-evry.fr/mpeg/doc_enduser/documents/131_Online/wg11/m54694-v3-m54694-v3.zip m54694-planar-and-azimuthal-modes-ctx-red_v2.docx. [Retrieved on Jul. 1, 2020].

(Continued)

*Primary Examiner* — Myron Wyche
(74) *Attorney, Agent, or Firm* — Shumaker & Sieffert, P.A.

(57) ABSTRACT

A device for encoding point cloud data, the device comprising: a memory to store the point cloud data; and one or more processors coupled to the memory and implemented in circuitry, the one or more processors configured to: determine a horizontal plane position of a node, wherein the horizontal plane position indicates a position of a single plane that is perpendicular to a first axis of a coordinate system, wherein the first axis is a horizontal axis; determine, from a plurality of contexts consisting of 8 contexts, a context for the horizontal plane position of the node; and perform arithmetic encoding on a syntax element indicating the horizontal plane position using the determined context.

29 Claims, 13 Drawing Sheets

(56) References Cited

U.S. PATENT DOCUMENTS

| | | | |
|---|---|---|---|
| 2019/0311499 | A1 | 10/2019 | Mammou et al. |
| 2020/0413080 | A1* | 12/2020 | Lasserre ............... H04N 19/96 |
| 2021/0012539 | A1 | 1/2021 | Zhang et al. |
| 2021/0103780 | A1 | 4/2021 | Mammou et al. |
| 2023/0048381 | A1 | 2/2023 | Taquet et al. |
| 2023/0065156 | A1 | 3/2023 | Yang et al. |
| 2023/0162402 | A1* | 5/2023 | Zhang .................... G06T 9/40 382/232 |
| 2023/0316586 | A1 | 10/2023 | Wan et al. |

OTHER PUBLICATIONS

Lasserre (Blackberry) S., et al., "The Azimuthal Coding Mode", [GPCC][CE13.22 related], 129. MPEG Meeting, Jan. 13, 2020-Jan. 17, 2020, Brussels, (Motion Picture Expert Group or ISO/IEC JTC1/SC29/WG11), No. m51596, Jan. 8, 2020, XP030224661, 31 Pages.

Lasserre S., et al., "m48906_Planar Mode in Octree-Based Geometry Coding", 127. MPEG Meeting, Jul. 8, 2019-Jul. 12, 2019, Gothenburg, (Motion Picture Expert Group or ISO/IEC JTC1/SC29/WG11) No. m48906, Jul. 3, 2019 (Jul. 3, 2019), XP030222328, 33 Pages, Retrieved from the Internet: URL:http://phenix.int-evry.fr/mpeg/doc_end_user/documents/127_Gothenburg/wg11/m48906-v1-m48906_Planarmodeinoctree-basedgeometrycoding.zip [retrieved on Jul. 3, 2019].

"Text of ISO/IEC 23090-9 DIS Geometry-Based Point Cloud Compression", 129. MPEG Meeting, Jan. 13, 2020-Jan. 17, 2020, Brussels, (Motion Picture Expert Group or ISO/IEC JTC1/SC29/WG11), No. n19088, Apr. 20, 2020 (Apr. 20, 2020), XP030287970, 126 Pages, Retrieved from the Internet: URL:http://phenix.int-evry.fr/mpeg/doc_end_user/documents/129_Brussels/wg11/w19088.zip w19088_d10_clean.pdf [retrieved on-Apr. 20, 2020].

Auwera (Qualcomm) G., et al., "[G-PCC] [New proposal] Planar Mode Simplifications", 132. MPEG Meeting, Oct. 12, 2020-Oct. 16, 2020, Online, (Motion Picture Expert Group or ISO/IEC JTC1/SC29/WG11), No. m55379, Oct. 13, 2020, 11 Pages, XP030291892.

Taquet (Blackberry) J., et al., "[G-PCC] [CE13.22 Related] Planar mode Buffer Optimization", 129. MPEG Meeting, Jan. 13, 2020-Jan. 17, 2020, Brussels, (Motion Picture Expert Group or ISO/IEC JTC1/SC29/WG11), No. m52345, Jan. 8, 2020, 7 Pages, XP030224981.

International Search Report and Written Opinion—PCT/US2021/038008—ISA/EPO—dated Oct. 4, 2021, 13 pp.

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

Sze V., et al., "Entropy Coding in HEVC" In: "High Efficiency Video Coding (HEVC)" Algorithms and Architectures—Chapter 8: Entropy Coding in HEVC, Springer International Publishing, Jan. 1, 2014 (Jan. 1, 2014), pp. 209-274, XP55263413, XP055594371, ISBN: 978-3-319-06894-7, DOI: 10.1007/978-3-319-06895-4_8, Section 8.6.4.2, Section 8.6.4.4, figure 8.21, table 8.9, 8.10, paragraph [8.8.3.1].

Anonymous: "Euclidean vs Chebyshev vs Manhattan Distance", May 22, 2012 (May 22, 2012), pp. 1-4, XP055873158, Retrieved from the Internet: URL: https://lyfat.wordpress.com/2012/05/22/euclidean-vs-chebyshev-vs-manhattan-distance/ [retrieved on Dec. 15, 2021].

European Search Report—EP23189340—Search Authority—Berlin—Nov. 28, 2023.

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

3DG: "G-PCC Future Enhancements", International Organisation for Standardisation Organisation Internationale De Normalisation, ISO/IEC JTC 1/SC 29/WG 11 Coding of Moving Pictures and Audio, ISO/IEC JTC 1/SC 29/WG 11, N18887, Geneva, CH—Oct. 2019, 128. MPEG Meeting, Oct. 7, 2019-Oct. 11, 2019, Geneva, (Motion Picture Expert Group or ISO/IEC JTC1/SC29/WG11), No. n18887, Dec. 23, 2019, XP030225587, 277 Pages.

* cited by examiner

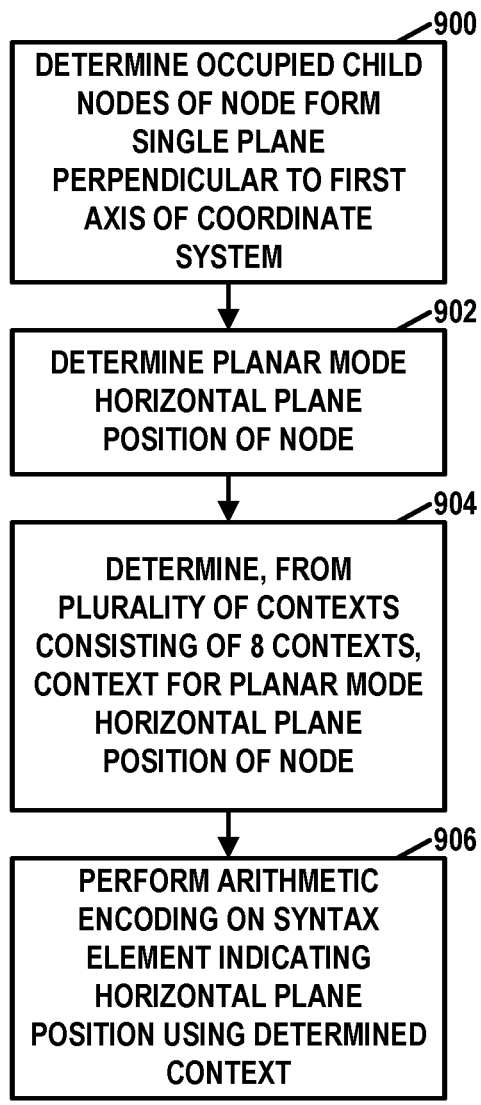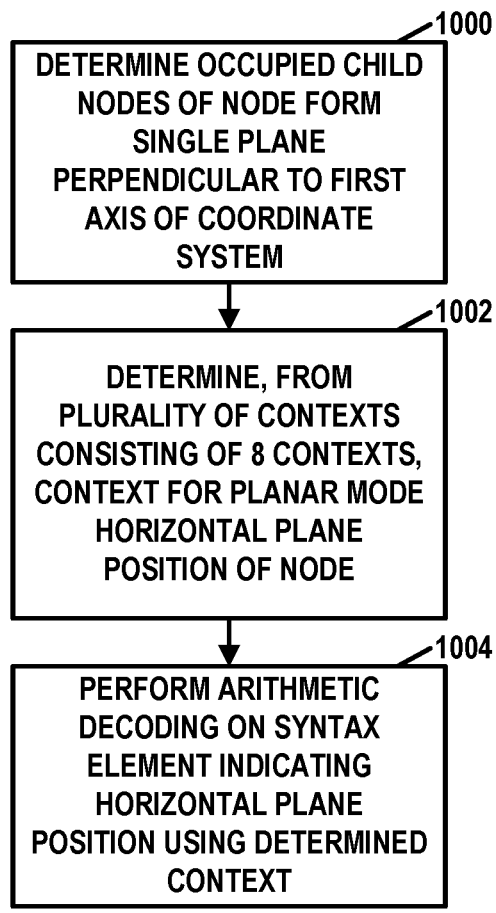
FIG. 9
FIG. 10

PLANAR AND AZIMUTHAL MODE IN GEOMETRIC POINT CLOUD COMPRESSION

This application claims the benefit of U.S. Provisional Patent Application 63/042,432, filed Jun. 22, 2020, and U.S. Provisional Patent Application 63/046,512, filed Jun. 30, 2020, the entire content of each of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point cloud data. Point cloud data comprises data representing a point cloud. Encoding point cloud data may reduce the amount of data required for storage and transmission of point cloud data.

SUMMARY

In general, this disclosure describes techniques that may simplify the planar and azimuthal modes in the Geometric Point Cloud Compression (GPCC) standard that is being developed within the Motion Picture Experts Group (MPEG) by the 3-dimensional graphics (3DG) group. More specifically, existing processes for determining contexts to use for arithmetic coding of syntax elements indicating plane positions and point offsets are complex. This complexity may increase hardware implementation costs and may slow down processes for encoding and decoding point cloud data. The techniques of this disclosure may address this technical issue. As described herein, reduced numbers of contexts may be available for use in arithmetic coding of plane position syntax elements and point offset syntax elements. This may decrease hardware implementation costs and/or accelerate processes for encoding and decoding point cloud data.

In one example, this disclosure describes a device for encoding point cloud data, the device comprising: a memory to store the point cloud data; and one or more processors coupled to the memory and implemented in circuitry, the one or more processors configured to: determine that occupied child nodes of a node form a single plane perpendicular to a first axis of a coordinate system, wherein the first axis is a horizontal axis and the occupied child nodes contain points represented by the point cloud data; determine a horizontal plane position of the node, wherein the horizontal plane position indicates a position of the single plane that is perpendicular to the first axis of the coordinate system; determine, from a plurality of contexts consisting of 8 contexts, a context for the horizontal plane position of the node; and perform arithmetic encoding on a syntax element indicating the horizontal plane position using the determined context.

In another example, this disclosure describes a device for decoding point cloud data, the device comprising: a memory to store the point cloud data; and one or more processors coupled to the memory and implemented in circuitry, the one or more processors configured to: determine that occupied child nodes of a node form a single plane perpendicular to a first axis of a coordinate system, wherein the first axis is a horizontal axis and the occupied child nodes contain points represented by the point cloud data; determine, from a plurality of contexts consisting of 8 contexts, a context for a horizontal plane position of the node, wherein the horizontal plane position indicates a position of the single plane that is perpendicular to the first axis of the coordinate system; and perform arithmetic decoding on a syntax element indicating the horizontal plane position using the determined context.

In another example, this disclosure describes a method for encoding point cloud data, the method comprising: determining that occupied child nodes of a node form a single plane perpendicular to a first axis of a coordinate system, wherein the first axis is a horizontal axis and the occupied child nodes contain points represented by the point cloud data; determining a horizontal plane position of the node, wherein the horizontal plane position indicates a position of the single plane that is perpendicular to the first axis of the coordinate system; determining, from a plurality of contexts consisting of 8 contexts, a context for the horizontal plane position of the node; and performing arithmetic encoding on a syntax element indicating the horizontal plane position using the determined context.

In another example, this disclosure describes a method for decoding point cloud data, the method comprising: determining that occupied child nodes of a node form a single plane perpendicular to a first axis of a coordinate system, wherein the first axis is a horizontal axis and the occupied child nodes contain points represented by the point cloud data; determining, from a plurality of contexts consisting of 8 contexts, a context for a horizontal plane position of the node, wherein the horizontal plane position indicates a position of the single plane that is perpendicular to the first axis of the coordinate system; and performing arithmetic decoding on a syntax element indicating the horizontal plane position using the determined context.

The details of one or more examples are set forth in the accompanying drawings and the description below. Other features, objects, and advantages will be apparent from the description, drawings, and claims.

BRIEF DESCRIPTION OF DRAWINGS

FIG. 9 is a flowchart of an example method for encoding point cloud data, in accordance with one or more techniques of this disclosure.

FIG. 10 is a flowchart of an example method for decoding point cloud data, in accordance with one or more techniques of this disclosure.

DETAILED DESCRIPTION

Figure 1:
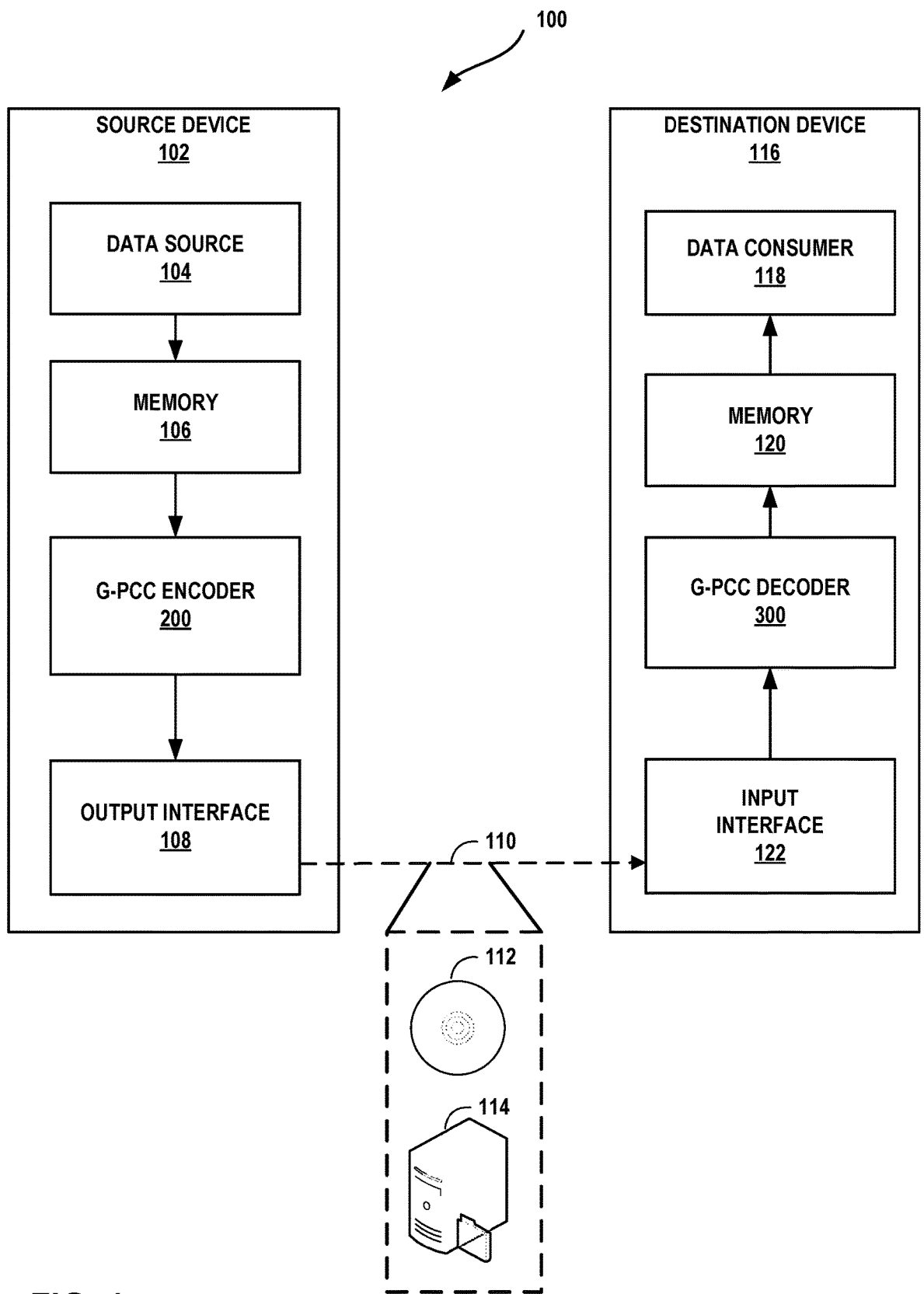
FIG. 1 is a block diagram illustrating an example encoding and decoding system that may perform the techniques of this disclosure.

A point cloud is a collection of points in a 3-dimensional (3D) space. Point cloud data may include all or some data representing a point cloud. Geometry-based point cloud compression (G-PCC) is an approach for reducing the amount of data needed to encode or store point clouds. As part of encoding a point cloud, a G-PCC encoder may generate an octree. Each node of the octree corresponds to a cuboid space. For ease of explanation, this disclosure may, in some circumstances, refer to a node and the cuboid space corresponding to the node interchangeably. Nodes of the octree can have zero child nodes or eight child nodes. In other examples, nodes can be divided into child nodes according to other tree structures. The child nodes of a parent correspond to equally sized cuboids within the cuboid corresponding to the parent node. The positions of individual points of a point cloud can be signaled relative to nodes corresponding to cuboids containing the points. If a node does not contain any points of the point cloud, the node is said to be unoccupied. If the node is unoccupied, it may not be necessary to signal additional data with respect to the node. Conversely, if a node contains one or more points of the point cloud, the node is said to be occupied.

Planar mode is a technique that may improve encoding or signaling of which nodes in the octree are occupied. Planar mode may be used when all occupied child nodes of the node are adjacent to a plane and on a side of the plane associated with increasing coordinate values for a dimension orthogonal to the plane. In other words, occupied child nodes of a node form a single plane perpendicular to an axis of a coordinate system. For instance, planar mode may be used for a node when all occupied child nodes of the node are above or below a horizontal plane passing through a center point of the node, or planar mode may be used for a node when all occupied child nodes of the node are on a close side or a farther side of a vertical plane passing through the center point of the node.

A G-PCC encoder may signal a plane position syntax element for each of an x, y, and z axis. The plane position syntax element for an axis (e.g., an x, y, or z axis) indicates whether the plane orthogonal to the axis is at a first position or a second position. If the plane is at the first position, the plane corresponds to a boundary of the node. If the plane is at the second position, the plane passes through a 3D center of the node. Thus, for the x-axis or y-axis, a G-PCC encoder or G-PCC decoder may code a horizontal plane position (i.e., a position of a plane perpendicular to a horizontal axis) in a node. A horizontal plane position syntax element indicates a position of a plane perpendicular to a horizontal axis, such as an x-axis or y-axis.

The G-PCC coder (e.g., a G-PCC encoder or G-PCC decoder) may use arithmetic coding, such as context-adaptive binary arithmetic coding (CABAC), to code plane position syntax elements. When the G-PCC coder uses arithmetic coding to code a plane position syntax element, the G-PCC coder may determine a context to use for arithmetic coding of the plane position syntax element. A context specifies probabilities for symbols used in arithmetic coding. As described in greater detail elsewhere in this disclosure, conventional techniques for determining the context are complex. Such complexity may slow the process of coding the point cloud data. Moreover, such complexity may increase the cost of hardware that implements G-PCC encoders and G-PCC decoders.

The positions of individual points of a point cloud can be encoded relative to nodes containing the points. In some examples, the positions of points in a node may be encoded using an inferred direct coding mode (IDCM). When a point is signaled using IDCM, a G-PCC encoder encodes a point offset that indicates an offset, in a specific axis (e.g., an x, y, or z axis), of the point relative to an origin point of the node. A point offset may also be referred to as a point position offset. This disclosure may refer to a point offset that indicates an offset, in a horizontal axis (e.g., an x-axis or a y-axis), of a point as an azimuthal point offset. This disclosure may refer to a point offset that indicates an offset, in a vertical axis (e.g., a z-axis), of a point as an angular point offset. G-PCC coders may determine a context and use the context in arithmetic coding (e.g., CABAC coding) of one or more bits of a point offset syntax element indicating the point offset.

This disclosure describes techniques that may reduce the complexity of determining contexts for horizontal plane position syntax elements and azimuthal point offset syntax elements. For instance, in one example, a G-PCC encoder may determine that occupied child nodes of a node form a single plane perpendicular to a first axis of a coordinate system, wherein the first axis is a horizontal axis (e.g., an x or y axis). In this example, the G-PCC encoder may determine a horizontal plane position of a node. The horizontal plane position indicates a position of the single plane that is perpendicular to the first axis of the coordinate system. The G-PCC encoder may determine, from a plurality of contexts consisting of 8 contexts, a context for the horizontal plane position of the node. The G-PCC encoder may perform arithmetic encoding on the horizontal plane position or an azimuthal point offset using the determined context. Similarly, a G-PCC decoder may determine that occupied child nodes of a node form a single plane perpendicular to a first axis of a coordinate system, wherein the first axis is a horizontal axis. The G-PCC decoder may determine, from a plurality of contexts consisting of 8 contexts, a context for a horizontal plane position of a node, wherein the horizontal plane position indicates a position of the single plane that is perpendicular to the first axis of the coordinate system. The G-PCC decoder may perform arithmetic decoding on a syntax element indicating the horizontal plane position or a point offset using the determined context.

Determining the context from a plurality of contexts consisting of 8 contexts, as opposed to the larger number of contexts previously used may reduce complexity of determining the context index. Reducing the complexity of determining the context index may accelerate encoding and decoding of point cloud data. Reducing the complexity of determining the context index may also reduce implementation costs of hardware for encoding and decoding point cloud data.

Although this disclosure describes lasers, laser beams, laser candidates, and other terms involving lasers, these terms are not necessarily limited to instances in which physical lasers are used. Rather, these terms may be used with respect to physical lasers or other range-finding technologies. Moreover, these terms may be used with respect to conceptual beams used for purposes of coding point clouds. In other words, the terms "laser," "laser beam," etc., may not refer to real lasers and laser beams, but rather the concept of a laser and laser beam may be used for purposes of coding point cloud data.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes representing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones and mobile phones, televisions, cameras, display devices, digital media players, video gaming consoles, video streaming devices, vehicles (e.g., terrestrial or marine vehicles, spacecraft, aircraft, etc.), robots, LIDAR devices, satellites, extended reality devices, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to coding syntax elements for the planar and azimuthal modes in the G-PCC. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to coding syntax elements for the planar and azimuthal modes in the G-PCC. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of point cloud data (i.e., raw, unencoded point cloud data) and may provide a sequential series of "frames" of the point cloud data to G-PCC encoder 200, which encodes point cloud data for the frames. In some examples, data source 104 generates the point cloud data. Data source 104 of source device 102 may include a point cloud capture device, such as any of a variety of cameras or sensors, e.g., a 3D scanner or a light detection and ranging (LIDAR) device, one or more video cameras, an archive containing previously captured point cloud data, and/or a data feed interface to receive point cloud data from a data content provider. Thus, in some examples, data source 104 may generate the point cloud data based on signals from a LIDAR apparatus. Alternatively or additionally, point cloud data may be computer-generated from scanner, camera, sensor or other data. For example, data source 104 may generate the point cloud data, or produce a combination of live point cloud data, archived point cloud data, and computer-generated point cloud data. In each case, G-PCC encoder 200 encodes the captured, pre-captured, or computer-generated point cloud data. G-PCC encoder 200 may rearrange frames of the point cloud data from the received order (sometimes referred to as "display order") into a coding order for coding. G-PCC encoder 200 may generate one or more bitstreams including encoded point cloud data. Source device 102 may then output the encoded point cloud data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw point cloud data, e.g., raw point cloud data from data source 104 and raw, decoded point cloud data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded point cloud data, e.g., output from G-PCC encoder 200 and input to G-PCC decoder 300. In some examples, portions of memory 106 and memory 120 may be allocated as one or more buffers, e.g., to store raw, decoded, and/or encoded point cloud data. For instance, memory 106 and memory 120 may store point cloud data.

Computer-readable medium 110 may represent any type of medium or device capable of transporting the encoded point cloud data from source device 102 to destination device 116. In one example, computer-readable medium 110 represents a communication medium to enable source device 102 to transmit encoded point cloud data directly to destination device 116 in real-time, e.g., via a radio frequency network or computer-based network. Output interface 108 may modulate a transmission signal including the encoded point cloud data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded point cloud data from output interface 108 to storage device 112. Similarly, destination device 116 may access encoded point cloud data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded point cloud data.

In some examples, source device 102 may output encoded point cloud data to file server 114 or another intermediate storage device that may store the encoded point cloud data generated by source device 102. Destination device 116 may access stored point cloud data from file server 114 via streaming or download. File server 114 may be any type of server device capable of storing encoded data and transmitting that encoded point cloud data to the destination device 116. File server 114 may represent a web server (e.g., for a website), a File Transfer Protocol (FTP) server, a content delivery network device, or a network attached storage (NAS) device. Destination device 116 may access encoded point cloud data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded point cloud data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded point cloud data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded point cloud data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that represent a point cloud. Data consumer 118 uses the decoded data. For example, data consumer 118 may use the decoded point cloud data to determine the locations of physical objects. In some examples, data consumer 118 may comprise a display to present imagery based on the point cloud data.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19328, teleconference, April 2020 (hereinafter, "w19238"), and a description of the codec is available in G-PCC Codec Description v6, ISO/IEC JTC1/SC29/WG11 w19091, Brussels, Belgium, January 2020 (hereinafter, "w19091").

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on the number of points in each partition, or based on other considerations (e.g., a particular region may be coded as tiles). The slice regions may be further partitioned using splitting decisions similar to those in video codecs.

Figure 2:
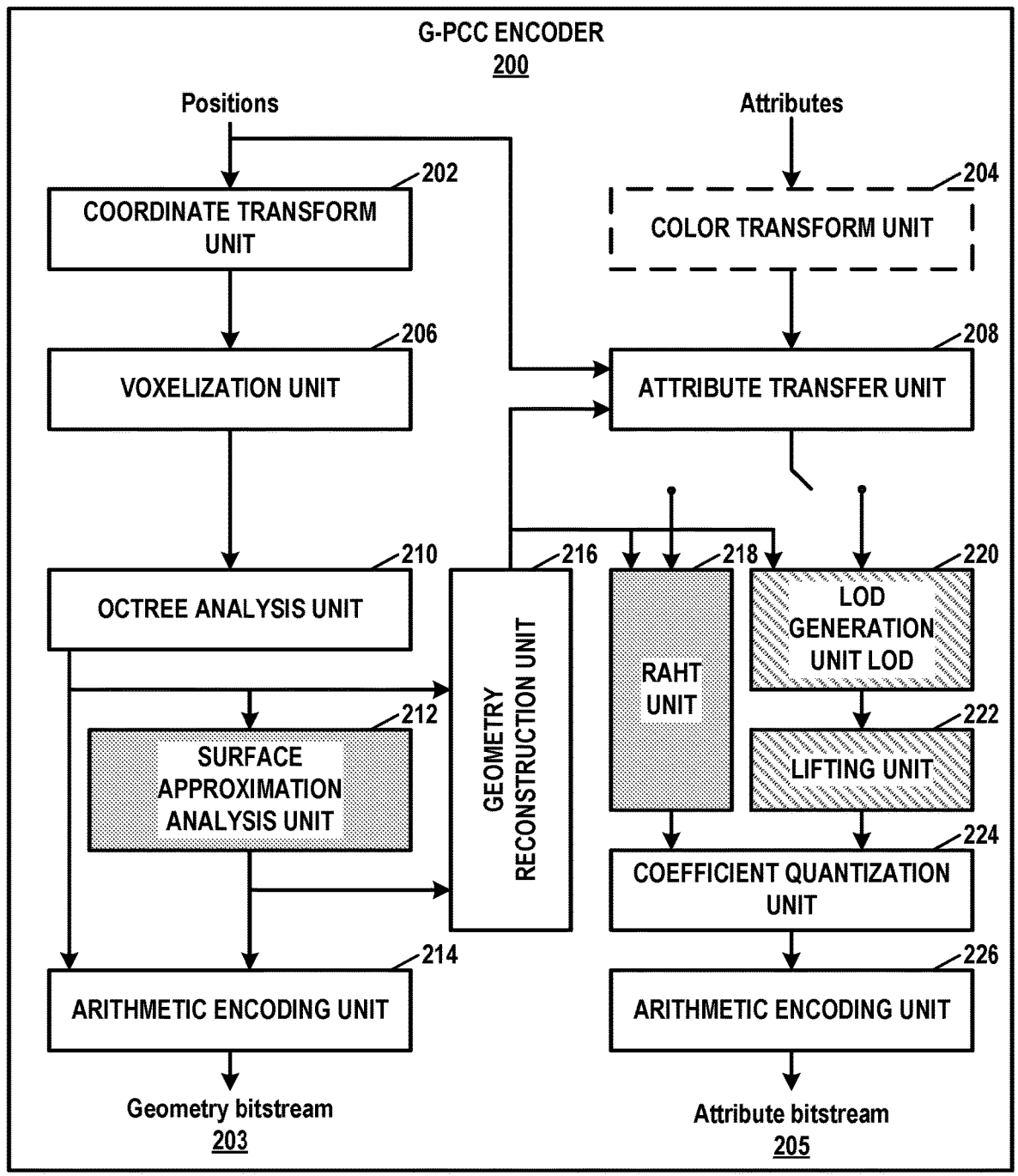
FIG. 2 is a block diagram illustrating an example Geometry Point Cloud Compression (G-PCC) encoder.
Figure 3:
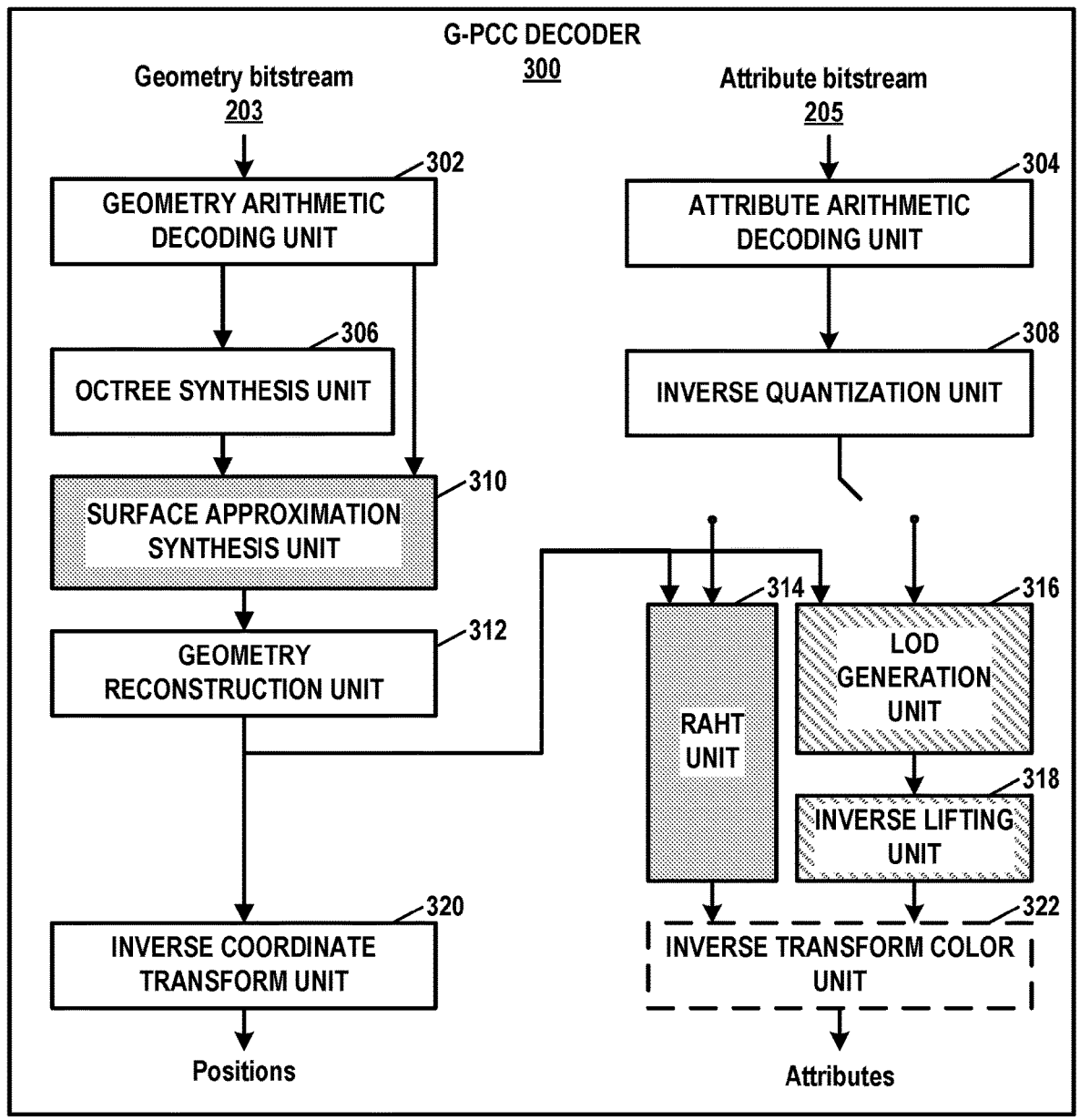
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports an inferred direct coding mode (IDCM) where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while predicting is typically used for Category 3 data. However, either method may be used for any data, and, like with the geometry codecs in G-PCC, the attribute coding method used to code the point cloud data is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes may be quantized. The quantized residuals may be coded using context adaptive binary arithmetic coding (CABAC). To apply CABAC encoding to a syntax element, G-PCC encoder 200 may binarize the value of the syntax element to form a series of one or more bits, which are referred to as "bins." In addition, G-PCC encoder 200 may identify a coding context (i.e., a context). The coding context may identify probabilities of bins having particular values. For instance, a coding context may indicate a 0.7 probability of coding a 0-valued bin and a 0.3 probability of coding a 1-valued bin. After identifying the coding context, G-PCC encoder 200 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, G-PCC encoder 200 may repeat these steps with the interval being the sub-interval associated with the value of the encoded bit. When G-PCC encoder 200 repeats these steps for the next bin, G-PCC encoder 200 may use modified probabilities based on the probabilities indicated by the identified coding context and the actual values of bins encoded.

When G-PCC decoder 300 performs CABAC decoding on a value of a syntax element, G-PCC decoder 300 may identify a coding context. G-PCC decoder 300 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, G-PCC decoder 300 may decode a bin having the value associated with the lower sub-interval. If the encoded value is within the upper sub-interval, G-PCC decoder 300 may decode a bin having the value associated with the upper sub-interval. To decode a next bin of the syntax element, G-PCC decoder 300 may repeat these steps with the interval being the sub-interval that contains the encoded value. When G-PCC decoder 300 repeats these steps for the next bin, G-PCC decoder 300 may use modified probabilities based on the probabilities indicated by the identified coding context and the decoded bins. G-PCC decoder 300 may then de-binarize the bins to recover the value of the syntax element.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to convert color information of the attributes to a different domain. For example, color transform unit 204 may convert color information from an RGB color space to a YCbCr color space.

Furthermore, in the example of FIG. 2, voxelization unit 206 may voxelize the transform coordinates. Voxelization of the transform coordinates may include quantizing and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may perform arithmetic encoding on syntax elements representing the information of the octree and/or surfaces determined by surface approximation analysis unit 212. G-PCC encoder 200 may output these syntax elements in a geometry bitstream 203.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud data.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream 205.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain a geometry bitstream 203 and an attribute bitstream 205. Geometry arithmetic decoding unit 302 of decoder 300 may apply arithmetic decoding (e.g., CABAC or other type of arithmetic decoding) to syntax elements in the geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

The planar coding mode proposed in Sébastien Lasserre, David Flynn, "[GPCC] Planar mode in octree-based geometry coding," ISO/IEC JTC1/SC29/WG11 MPEG/m48906, Gothenburg, Sweden, July 2019 was adopted at the $128^{th}$ MPEG meeting in Geneva, Switzerland (see Sébastien Lasserre, Jonathan Taquet, "[GPCC] CE13.22 report on planar coding mode," ISO/IEC JTC1/SC29/WG11 MPEG/m50008, Geneva, Switzerland, October 2019). The angular coding mode proposed in Sébastien Lasserre, Jonathan Taquet, "[GPCC][CE 13.22 related] An improvement of the planar coding mode," ISO/IEC JTC1/SC29/WG11 MPEG/m50642, Geneva, CH, October 2019, was adopted at the $129^{th}$ MPEG meeting in Brussels, Belgium (see Sébastien Lasserre, Jonathan Taquet, "[GPCC] CE 13.22 report on angular mode," ISO/IEC JTC1/SC29/WG11 MPEG/m51594, Brussels, Belgium, January 2020).

Figure 4:
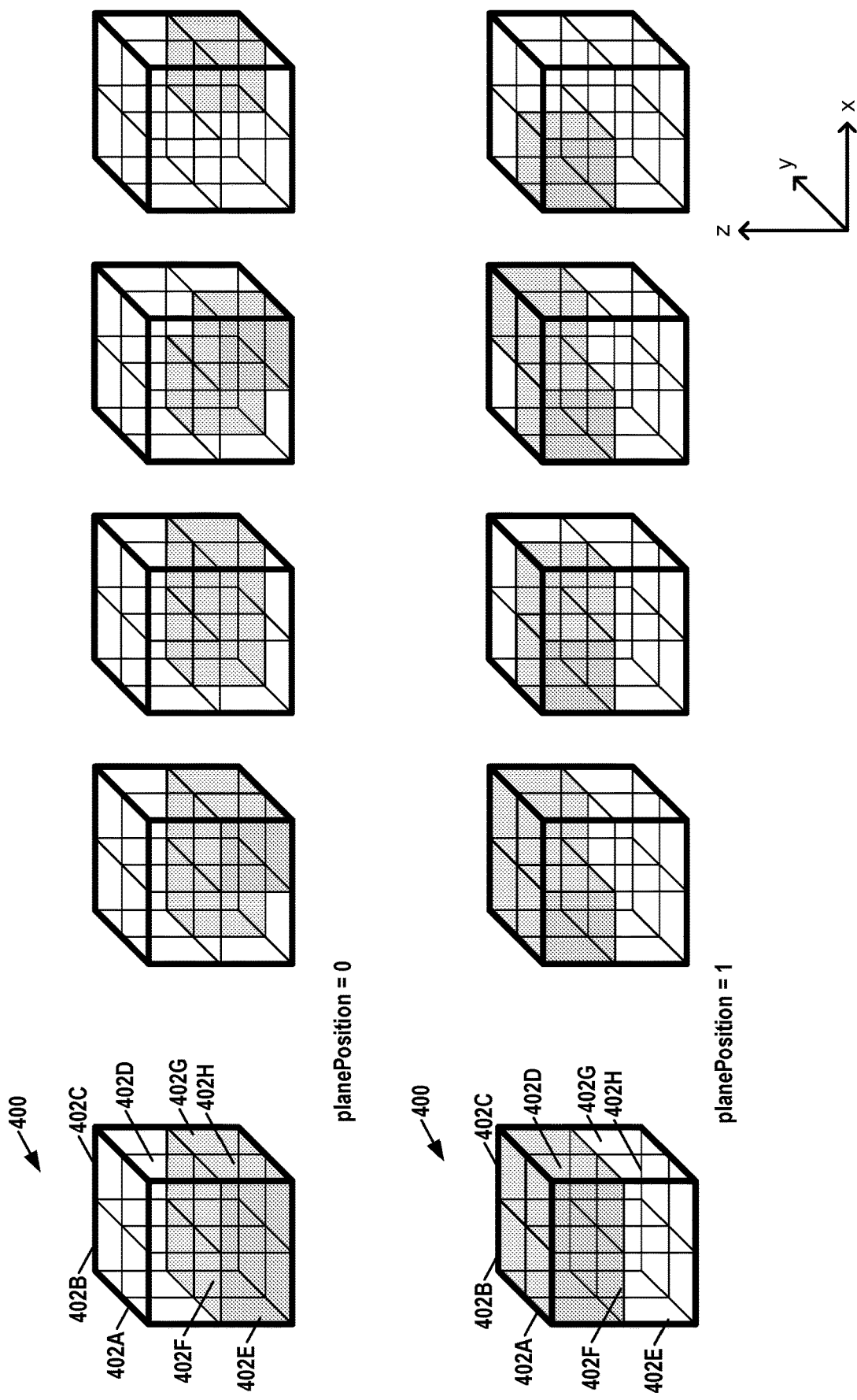
FIG. 4 is a conceptual diagram illustrating example planar occupancy in a vertical direction.

FIG. 4 is a conceptual diagram illustrating example planar occupancy in a vertical direction. In the example of FIG. 4, a node 400 is partitioned into eight child nodes 402A-402H (collectively, "child nodes 402"). Child nodes 402 may be occupied or unoccupied. In the example of FIG. 4, occupied child nodes are shaded. When one or more child nodes 402A-402D are occupied and none of child nodes 402E-402H are occupied, G-PCC encoder 200 may encode a plane position syntax element (e.g., plane_position) with a value of 0 to indicate that all occupied child nodes of node 400 are adjacent on a positive side (i.e., a side of increasing z-coordinates) of a plane of the minimum z coordinate of node 400. When one or more child nodes 402E-402H are occupied and none of child nodes 402A-402D are occupied, G-PCC encoder 200 may encode a plane position syntax element with a value of 1 to indicate that all occupied child nodes are adjacent on a positive side of a plane of a midpoint z coordinate of node 400. In this way, the plane position syntax element may indicate a vertical plane position (i.e., a position of a plane perpendicular to a vertical axis) for node 400.

The angular coding mode may enhance the coding efficiency of the planar mode by using the sensor characteristics of a typical LIDAR sensor. The angular coding mode is optionally used together with the planar mode and may improve the coding of the vertical (z) plane position syntax element by employing knowledge of positions and angles of sensing laser beams in a typical LIDAR sensor. Furthermore, the angular coding mode can optionally be used to improve the coding of vertical z-position bits in IDCM. In a separate contribution, Geert Van der Auwera, Bappaditya Ray, Louis Kerofsky, Adarsh K. Ramasubramonian, Marta Karczewicz, "[GPCC][New Proposal] Angular mode simplifications and HLS refinements," ISO/IEC JTC1/SC29/WG11 MPEG/m53693, Teleconference (previously Alpbach meeting), April 2020, the angular coding mode's context derivation was simplified and the HLS coding of sensor data parameters was made more efficient. The angular mode descriptions in the following sections are based on the original MPEG contributions documents Sébastien Lasserre, Jonathan Taquet, "[GPCC][CE 13.22 related] An improvement of the planar coding mode," ISO/IEC JTC1/SC29/WG11 MPEG/m50642, Geneva, CH, October 2019 and Sébastien Lasserre, Jonathan Taquet, "[GPCC] CE 13.22 report on angular mode," ISO/IEC JTC1/SC29/WG11 MPEG/m51594, Brussels, Belgium, January 2020 and the GPCC DIS text (G-PCC DIS, ISO/IEC JTC1/SC29/WG11 w19328, Teleconference (previously Alpbach meeting), April 2020).

The azimuthal coding mode first proposed in Sébastien Lasserre, Jonathan Taquet, "[GPCC] [CE13.22 related] The azimuthal coding mode," ISO/IEC JTC1/SC29/WG11 MPEG/m51596, Brussels, Belgium, January 2020, was adopted at the $130^{th}$ MPEG teleconference meeting. (See Sébastien Lasserre, Jonathan Taquet, "[GPCC] [CE 13.22] Report on azimuthal coding mode," ISO/IEC JTC1/SC29/WG11 MPEG/m52958, Teleconference (previously Alpbach meeting), April 2020). The azimuthal coding mode is similar to the angular mode and extends the angular mode to the coding of the (x) and (y) plane position syntax elements of the planar mode and improves the coding of the x- or y-position bits in IDCM. Thus, "angular mode" may also refer to azimuthal mode in sections below.

Figure 5:
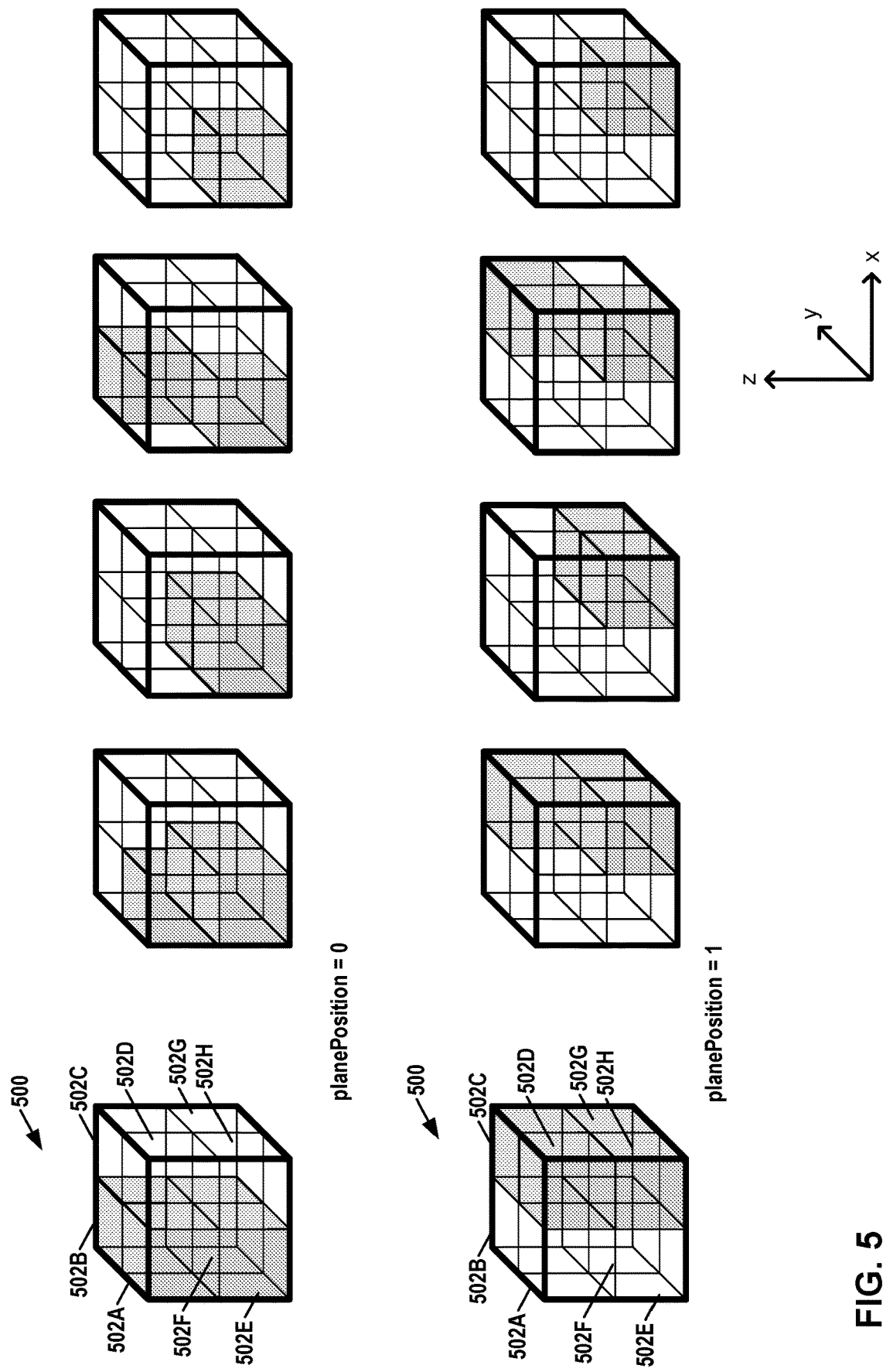
FIG. 5 is a conceptual diagram illustrating example planar occupancy in a first horizontal direction.

FIG. 5 is a conceptual diagram illustrating example planar occupancy in a horizontal direction. More specifically, FIG. 5 illustrates planar occupancy for coding of an x plane position. In the example of FIG. 5, a node 500 is partitioned into eight child nodes 502A-502H (collectively, "child nodes 502"). Child nodes 502 may be occupied or unoccupied. In the example of FIG. 5, occupied child nodes are shaded. When one or more child nodes 502A, 502B, 502E, and 502F are occupied and none of child nodes 502C, 502D, 502G, and 502H are occupied, G-PCC encoder 200 may signal a plane position (planePosition) syntax element with a value of 0 to indicate that all occupied child nodes are adjacent on a positive side (i.e., a side of increasing x-coordinates) of a plane of the minimum x coordinate of node 500. Accordingly, when the plane position has a value of 0, it may not be necessary for G-PCC encoder 200 to encode further syntax elements associated with child nodes 502C, 502D, 502G, or 502H. When one or more child nodes 502C, 502D, 502G, and 502H are occupied and none of child nodes 502A, 502B, 502E, or 502F are occupied, G-PCC encoder 200 may signal a plane position (planePosition) syntax element with a value of 1 to indicate that all occupied child nodes are adjacent on a positive side of a plane of a midpoint x coordinate of node 500. Accordingly, when the plane position has a value of 1, it may not be necessary for G-PCC encoder 200 to encode further syntax elements associated with child nodes 502A, 502B, 502E, or 502F. In this way, the plane position syntax element may indicate a horizontal plane position of a planar mode in node 500.

Figure 6:
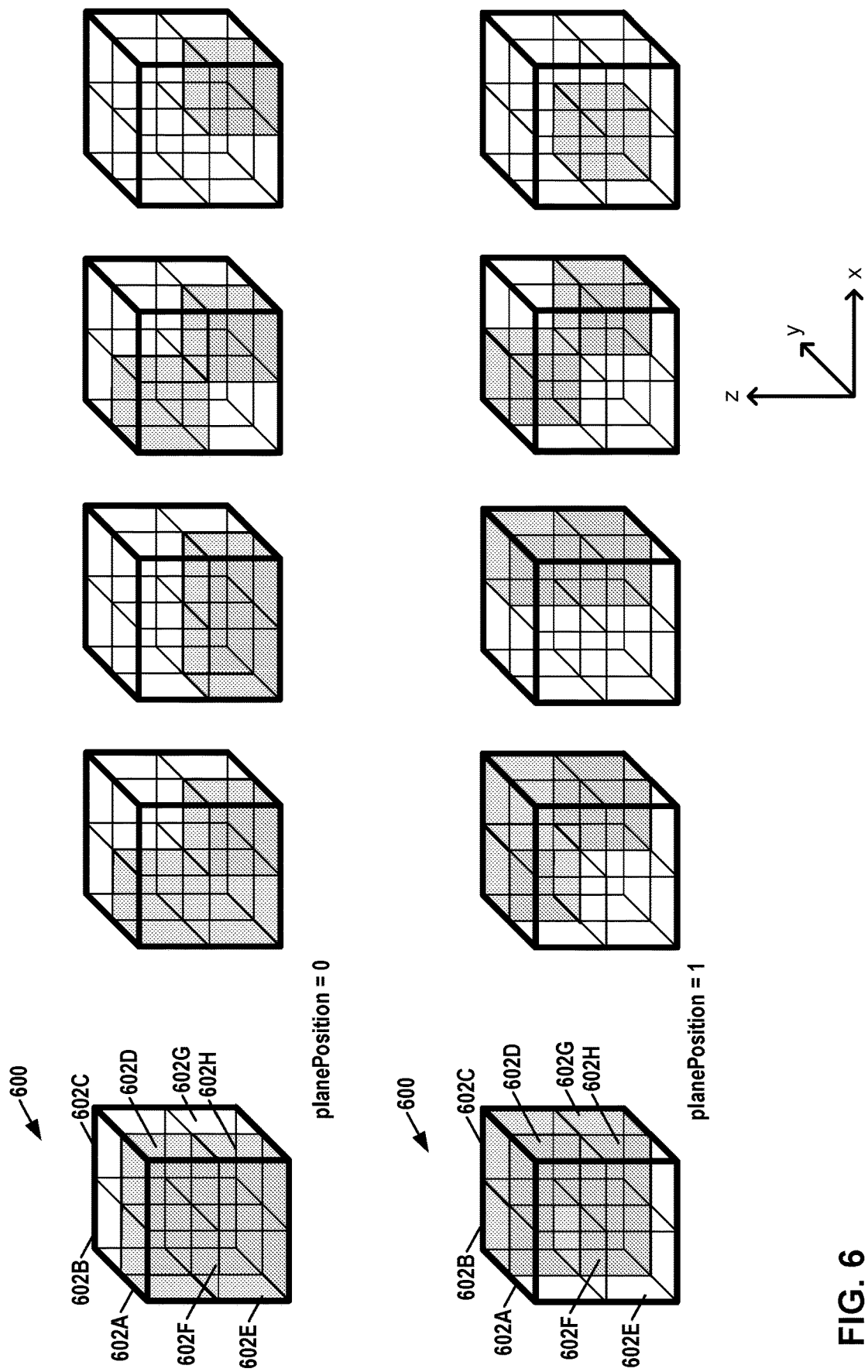
FIG. 6 is a conceptual diagram illustrating example planar occupancy in a second horizontal direction.

FIG. 6 is a conceptual diagram illustrating example planar occupancy in a horizontal direction. More specifically, FIG. 6 illustrates planar occupancy for coding of a y plane position. In the example of FIG. 6, a node 600 is partitioned into eight child nodes 602A-602H (collectively, "child nodes 602"). Child nodes 602 may be occupied or unoccupied. In the example of FIG. 6, occupied child nodes are shaded. When one or more child nodes 602A, 602D, 602E, and 602H are occupied and none of child nodes 602B, 602C, 602F, and 602G are occupied, G-PCC encoder 200 may signal a plane position (planePosition) syntax element with a value of 0 to indicate that all occupied child nodes are adjacent on a positive side (i.e., a side of increasing y-coordinates) of a plane of the minimum y coordinate of node 600. Accordingly, when the plane position has a value of 0, it may not be necessary for G-PCC encoder 200 to encode further syntax elements associated with child nodes 602B, 602C, 602F, or 602G. When one or more child nodes 602B, 602C, 602F, and 602G are occupied and none of child nodes 602A, 602D, 602E, or 602H are occupied, G-PCC encoder 200 may signal a plane position (planePosition) syntax element with a value of 1 to indicate that all occupied child nodes are adjacent on a positive side of a plane of a midpoint y coordinate of node 600. Accordingly, when the plane position has a value of 1, it may not be necessary for G-PCC encoder 200 to encode further syntax elements associated with child nodes 602A, 602D, 602E, or 602H. In this way, the plane position syntax element may indicate a horizontal plane position of a planar mode in node 600.

G-PCC encoder 200 may encode syntax elements related to the planar mode. These syntax elements may include a planar mode flag (e.g., an is_planar flag syntax element) that indicates whether a node is planar in a direction perpendicular to a particular axis (e.g., an axisIdx-th axis). The syntax elements related to the planar mode may also include a plane position syntax element (e.g., plane_position) that indicates a position of a plane for planar mode. The following discussion describes example semantics for syntax elements related to the planar mode, and a description of associated variables.

Planar Coding Mode is_planar_flag[childIdx][axisIdx] equal to 1 indicates that the current child node is planar in the direction perpendicular to the axisIdx-th axis. is_planar_flag[child][axisIdx] equal to 0 indicates that the current child node is not planar in the direction perpendicular to the axisIdx-th axis. When not present, the value of is_planar_flag[childIdx][axisIdx] is inferred to be 0.

The variable two_planar_flag indicates if a node is planar in at least two directions and is determined as follows:

```
two_planar_flag[nodeIdx] =
    (is_planar_flag[nodeIdx][0] &&
  is_planar_flag[nodeIdx][1])
    || (is_planar_flag[nodeIdx][0] &&
  is_planar_flag[nodeIdx][2])
    || (is_planar_flag[nodeIdx][1] &&
  is_planar_flag[nodeIdx][2])
``` plane_position[childIdx][axisIdx] equal 0 indicates that the position of the plane for the planar mode is the lower position relative to increasing i-th co-ordinates. plane_position[childIdx][axisIdx] equal 1 indicates that the position of the plane for the planar mode is the higher position relative to increasing axisIdx-th co-ordinates.

Only specific types of nodes are eligible to be encoded using a planar coding mode. In general, a node is eligible to be encoded using a planar coding mode if an estimated density of occupied child nodes of the node is below a specific threshold and a probability of using planar mode is above another threshold. In the following text, a variable eligible_planar_flag indicates whether a node is eligible to be encoded using a planar coding mode.

3.2.1 Eligiblity of a Node for Planar Coding Mode

For an axis index axisIdx in the range 0 . . . 2, the value of eligible_planar_flag[axisIdx] for a current node is determined as follows:

```
if (depth == GeomScalingDepth - 1)
    eligible_planar_flag[axisIdx] = 0
else if (localDensity >= 3 × 1024)
    eligible_planar_flag[axisIdx] = 0
else {
    eligible_planar_flag[axisIdx] =
    planeRate[axisIdx] >=
  geom_planar_mode_th[probable_order[axisIdx]]
}
```

The variable GeomScalingDepth indicates the geometry octree depth at which the value of ScalingNodeSizeLog2 (a size of a scaled position component) is determined. Thus, GeomScalingDepth–1 describes this depth level because if quantization were to happen in the child nodes, planar mode is not allowed at the current node. The variable localDensity is an estimate of the mean number of occupied child nodes in a node. localDensity may be initialized to the value localDensity=1024*4 when starting the geometry decoding process.

The variable planeRate[axisIdx], for axisIdx in the range 0 . . . 2, is an estimate of the probability for a node to be planar in the direction perpendicular to the axisIdx-th axis. planeRate[axisIdx] is initialized to the value planeRate[axisIdx]=128*8 when starting the geometry decoding process.

After decoding occupancy map or occupancy byte of a current node, the values of localDensity and planeRate[axisIdx] may be updated by:

```
localDensity = ((localDensity << 8) - localDensity + 1024 ×
  GeometryNodeChildrenCnt) >> 8
if (isNodePlanar[axisIdx])
    planeRate[axisIdx] = ((planeRate[axisIdx] << 8) -
  planeRate[axisIdx] + 256 + 128) >> 8
else
    planeRate[axisIdx] = ((planeRate[axisIdx] << 8) -
  planeRate[axisIdx] + 128) >> 8
``` where isNodePlanar[axisIdx] is equal to 1 if the current node is planar in the direction perpendicular to the axisIdx-th axis, and is equal to 0 otherwise.

The three values of probable_order[ ] may be deduced from the ordering of the three-entry array planeRate[ ] as defined in Table 1, below.

TABLE 1

Determination of the values of probable_order[] from planeRate[]

| Condition | probable_order[ 0 ] | probable_order[ 1 ] | probable_order[ 2 ] |
|---|---|---|---|
| planeRate[0] ≥ planeRate[1] ≥ planeRate[2] | 0 | 1 | 2 |
| planeRate[0] ≥ planeRate[2] > planeRate[1] | 0 | 2 | 1 |
| planeRate[1] > planeRate[0] ≥ planeRate[2] | 1 | 0 | 2 |
| planeRate[1] > planeRate[2] > planeRate[0] | 2 | 0 | 1 |
| planeRate[2] > planeRate[0] ≥ planeRate[1] | 1 | 2 | 0 |
| planeRate[2] > planeRate[1] > planeRate[0] | 2 | 1 | 0 |

3.2.2 Buffer Tracking the Closest Nodes Along an Axis

The arrays PlanarPrevPos, PlanarPlaneOffset, IsPlanar record information about previously decoded geometry tree nodes for use in the determination of ctxIdx for the syntax elements is_planar_flag and plane_position. When either geometry_planar_mode_flag is equal to 0 or planar_buffer_disabled_flag is equal to 1, the arrays are not used by the decoding process.

In this process, the variable axisIdx is used to represent one of the three coded axes, the variable axisPos represents the position of a node along the axisIdx-th axis. Values of axisPos are in the range 0 . . . 0x3fff.

The array IsPlanarNode, with values IsPlanarNode[axisIdx][axisPos] indicates if the most recently decoded node with an axisIdx-th position component equal to axisPos is planar in the plane perpendicular to the axisIdx-th axis.

The array PlanarPrevPos, with values PlanarPrevPos[axisIdx][axisPos][k] identifies the k-th component of the most recently decoded node with an axisIdx-th position component equal to axisPos.

The array PlanarPlaneOffset, with values PlanarPlaneOffset[axisIdx][axisPos] indicates the value of plane_position for the most recently decoded node with an axisIdx-th position component equal to axisPos.

At the start of each geometry tree level, each element of the arrays PlanarPrevPos and IsPlanarNode is initialized to 0.

After decoding each geometry_planar_mode_data syntax structure with parameters childIdx and axisIdx, the arrays PlanarPrevPos, PlanarPlane and IsPlanar are updated as follows:

The array childPos is set to the spatial position of the corresponding child node as follows:

childPos[0]=2×sN+(childIdx & 4==1)
childPos[1]=2×tN+(childIdx & 2==1)
childPos [2]=2×vN+(childIdx & 1==1)

The variable axisPos representing a position along the axisIdx-th axis is derived as follows:

axisPos=childPos[axisIdx] & 0x3fff

The array entries corresponding to the child node are updated as follows:

```
for (k = 0; k < 3; k++)
    if (k != axisIdx)
        PlanarPrevPos [axisIdx] [axisPos] [k] = (childPos [k] >>
1) & 0x7f
```

-continued

```
if (is_planar_flag [childIdx] [axisPos] )
    PlanarPlane [axisIdx] [axisPos] =
plane_position [childIdx] [axisIdx]
IsPlanar [axisIdx] [axisPos] =
is_planar_flag [childIdx] [axisIdx]
```

G-PCC encoder 200 and G-PCC decoder 300 may perform arithmetic encoding (e.g., CABAC encoding) and arithmetic decoding (e.g., CABAC decoding) on certain syntax elements, such as a planar mode flag (e.g., is_planar_flag) and a plane position syntax element (e.g., plane_position), relative to the planar coding mode. As part of performing arithmetic coding, G-PCC encoder 200 or G-PCC decoder 300 may determine a context. The context indicates probabilities for a pair of symbols. The angular and azimuthal planar coding modes may be enabled or disabled in a bitstream. The planar mode may be used when the angular planar coding mode and azimuthal planar coding mode are enabled or disabled. However, the process for determining a context for arithmetic coding the planar mode flag and plane position syntax element may be different depending on whether the angular and azimuthal planar coding modes are enabled or disabled.

The following text describes example processes that G-PCC encoder 200 and G-PCC decoder 300 may use for determining common variables used in determining a context index for the planar mode flag and plane position syntax element when angular and azimuthal planar coding modes are disabled.

3.2.3 Common Variables Used in the Determination of ctxIdx for the Syntax Elements is_Planar_Flag and Plane_Position The inputs to this process are:
  the variable childIdx identifying the child of the current node,
  the variable axisIdx identifying the axis normal to a plane, and
  the position (sN, tN, vN) of the current node within a geometry tree level.

The outputs of this process are the variables axisPos, axisOffset, dist, neighOccupied. The array childPos is set to the spatial position of the corresponding child node as follows:

childPos[0]=2×sN+(childIdx & 4==1)
childPos[1]=2×tN+(childIdx & 2==1)
childPos[2]=2×vN+(childIdx & 1==1)

The variable axisOffset identifies the position of a plane relative to the current node that intersects the corresponding child node normal to the axisIdx-th axis:

axisOffset=childPos[axisIdx] & 1

The variable axisPos indicates the position of the child node along the axisIdx-th axis:

axisPos=childPos[axisIdx] & 0x3fff

The variable dist represents the Manhattan distance between childPos and the most recently decoded child node position with the same value of axisPos along the axisIdx-th axis. The variable dist is derived as follows:

```
dist = 0
for (k = 0; k < 3; k++)
    if (k != axisIdx) {
        a = PlanarPrevPos[axisIdx][axisPos][k]
        b = (childPos[axisIdx][k] >> 1) & 0x7f
        dist += Abs(a − b)
    }
```

The variable neighOccupied indicates whether there is an occupied node that both neighbors the current node along the axisIdx-th axis and is spatially adjacent to the current child node. The variable neighOccupied may be derived as follows:

```
neighPatternBitIdx = 2 × axisIdx + axisOffset ^
    (axisIdx ? 0 : 1)
neighOccupied = (NeighbourPattern >>
    neighPatternBitIdx & 1
```

The following is a description of an example process for determining a context index for the planar mode flag (e.g., is_planar_flag) when angular and azimuthal modes are disabled.

3.2.4 Determination of ctxIdx for the Syntax Element is Planar Flag

The inputs to this process are:
  the variable childIdx identifying the child of the current node,
  the variable axisIdx identifying the axis normal to a plane, and
  the position (sN, tN, vN) of the current node within a geometry tree level.

The output of this process is the variable ctxIdx.

When planar_buffer_disabled_flag is equal to 1, the value of ctxIdx is set equal to axisIdx and no further processing is performed. Otherwise, the remainder of this clause applies.

The variables neighOccupied and dist are determined according to the common variable determination process described above.

The context index ctxIdx is derived as follows:
ctxIdx=axisIdx+3×neighOccupied+(dist<=1 ? 0:6)

The following is a description of an example process for determining a context index for the plane position syntax element (e.g., plane_position) when angular and azimuthal planar coding modes are disabled.

3.2.5 Determination of ctxIdx for the Syntax Element Plane_Position

The inputs to this process are:
  the variable childIdx identifying the child of the current node,
  the variable axisIdx identifying the axis normal to a plane, and
  the position (sN, tN, vN) of the current node within a geometry tree level.

The output of this process is the variable ctxIdx.

When planar_buffer_disabled_flag is equal to 1, the value of ctxIdx is set equal to 0 and no further processing is performed by this process. Otherwise, the remainder of this clause applies.

The variables axisOffset, neighOccupied, and dist are determined according to the common variable determination process described above.

The context index ctxIdx is derived as follows:

```
if (!IsPlanar[axisIdx][axisPos])
    ctxIdx = 0
else {
    distCtxInc = (dist > 1) + (dist > 8)
    ctxIdx = axisIdx + 3 × neighOccupied + 6 × distCtxInc +
    18 × axisOffset + 1
}
```

When angular planar coding mode is enabled, G-PCC encoder 200 and G-PCC decoder 300 may determine a variable planePosIdxAngular that indicates a context for a plane position syntax element (e.g., plane_position) for the vertical axis. The following text provides a description of how G-PCC encoder 200 and G-PCC decoder 300 may determine a value of planePosIdxAngular.

3.2.6 Determination of planePosIdxAngular for the Coding of the Vertical Plane Position The determination of planePosIdxAngular for the arithmetic coding of plane_position[child][2] is obtained as follows.

In case geometry_angular_mode_flag is equal to 0, i.e., the angular coding mode is not used, the value of planePosIdxAngular is set equal to planePosIdx.

In case geometry_angular_mode_flag is equal to 1, the value of planePosIdxAngular is determined from contextAngular by:

```
if (contextAngular == −1)
    planePosIdxAngular = planePosIdx
else
    planePosIdxAngular = 36 + contextAngular[child]
```

The determination of contextAngular[child] for the arithmetic coding of plane_position[child][2] may be performed as described in section 8.2.5.3 of G-PCC DIS, ISO/IEC JTC1/SC29/WG11 w19328, Teleconference (previously Alpbach meeting), April 2020.

3.2.7 Determination of the Probability Proba_Planar[ ] of Good Plane Position Prediction The information proba_planar[ ] on the probability of good plane position prediction is used in the determination of the direct coding mode activation flag DirectModeFlagPresent. The value of proba_planar[axisIdx], for an axis index in the range 0 . . . 2, is in the range 1 . . . 127 and is deduced as follows for each child node

```
proba_planar[axisIdx] = 127
if (is_planar_flag[child][axisIdx]) {
    if (axisIdx <= 1)
        p = p0[planePosIdx] >> 9
    else
        p = p0[planePosIdxAngular] >> 9
```

-continued

```
        if (plane_position[child][axisIdx])
            p = 128 − p
        if (p < 1)
            p = 1
        if (p > 127)
            p = 127
        proba_planar[axisIdx] = p
}
``` where p0[planePosIdx] (respectively p0[planePosIdxAngular]) is the probability, provided by CABAC before decoding the bit plane_position[child][axisIdx], of having a zero associated with the context. This probability p0[planePosIdx] (respectively p0[planePosIdxAngular]) is provided as a 16-bit unsigned integer in the range 0 . . . 0xffff.

Note that proba_planar[axisIdx] does not need to depend on the child node because the direct mode is activated if there is only one occupied child node in the current node.

The G-PCC specification provides a set of syntax elements related to angular and azimuthal planar coding modes. As described briefly elsewhere in this disclosure, when encoding a node with angular mode (i.e., angular planar coding mode), G-PCC encoder 200 encodes the node using a planar mode with a plane perpendicular to a vertical axis (e.g., a z-axis). When encoding a node with an azimuthal mode (i.e., an azimuthal planar coding mode), G-PCC encoder 200 encodes the node using a planar mode with a plane perpendicular to a horizontal axis (e.g., an x-axis or a y-axis). The following text provides a description of syntax elements related to the angular and azimuthal planar coding modes. More specifically, the syntax elements that carry the LIDAR laser sensor information that are required for the angular planar coding mode to have any coding efficiency benefits are indicated with <!> . . . </!> tags in Table 2, below.

TABLE 2

Geometry parameter set syntax. Angular planar coding mode syntax elements are indicated with <!> . . . </!> tags.

| geometry_parameter_set( ) { | Descriptor |
|---|---|
| gps_geom_parameter_set_id | ue(v) |
| gps_seq_parameter_set_id | ue(v) |
| gps_gsh_box_log2_scale_present_flag | u(1) |
| if( !gps_gsh_box_log2_scale_present_flag) | |
|     gps_gs_box_log2_scale | ue(v) |
| unique_geometry_points_flag | u(1) |
| geometry_planar_mode_flag | u(1) |
| if( geometry_planar_mode_flag){ | |
|     geom_planar_mode_th_idcm | ue(v) |
|     geom_planar_mode_th[ 0 ] | ue(v) |
|     geom_planar_mode_th[ 1 ] | ue(v) |
|     geom_planar_mode_th[ 2 ] | ue(v) |
|     <!>geometry_angular_mode_flag</!> | <!>u(1)</!> |
| } | |
| <!> if( geometry_angular_mode_flag){</!> | |
| <!>   for( k = 0; k < 3; k++) </!> | |
| <!>      geom_angular_origin_xyz[ k ] </!> | <!>se(v)</!> |
| <!>   number_lasers_minus1</!> | <!>ue(v)</!> |
| <!>   laser_angle[ 0 ] </!> | <!>se(v)</!> |
| <!>   laser_correction[ 0 ] </!> | <!>ue(v)</!> |
| <!>   for( i = 1; i <= number_lasers_minus1; i++ ) {</!> | |
| <!>      laser_angle_diff[ i ] </!> | <!>ue(v)</!> |
| <!>      laser_correction_diff[ i ] </!> | <!>se(v)</!> |
| <!>   }</!> | |
| <!>   planar_buffer_disabled_flag</!> | <!>u(1)</!> |
| <!> }</!> | |
| neighbour_context_restriction_flag | u(1) |
| inferred_direct_coding_mode_enabled_flag | u(1) |

TABLE 2-continued

Geometry parameter set syntax. Angular planar coding mode syntax elements are indicated with <!> . . . </!> tags.

| geometry_parameter_set( ) { | Descriptor |
|---|---|
| bitwise_occupancy_coding_flag | u(1) |
| adjacent_child_contextualization_enabled_flag | u(1) |
| log2_neighbour_avail_boundary | ue(v) |
| log2_intra_pred_max_node_size | ue(v) |
| log2_trisoup_node_size | ue(v) |
| geom_scaling_enabled_flag | u(1) |
| if( geom_scaling_enabled_flag ) { | |
|    geom_base_qp | ue(v) |
|    geom_direct_coding_mode_qp_offset | se(v) |
| } | |
| geom_tree_coded_axis_list_present_flag | u(1) |
| gps_extension_flag | u(1) |
| if( gps_extension_flag) | |
|    while( more_data_in_byte_stream( ) ) | |
|       gps_extension_data_flag | u(1) |
| byte_alignment( ) | |
| } | |

The semantics of the syntax elements related to the angular planar coding mode, as specified in G-PCC DIS, ISO/IEC JTC1/SC29/WG11 w19328, Teleconference (previously Alpbach meeting), April 2020, are presented below.

geometry_planar_mode_flag equal to 1 indicates that the planar coding mode is activated. geometry_planar_mode_flag equal to 0 indicates that the planar coding mode is not activated.

geom_planar_mode_th_idcm specifies the value of the threshold of activation for the direct coding mode. geom_planar_mode_th_idcm is an integer in the range 0 to 127 inclusive. When not present, geom_planar_mode_th_idcm is inferred to be 127.

geom_planar_mode_th[i], for i in the range 0 . . . 2, specifies the value of the threshold of activation for planar coding mode along the i-th most probable direction for the planar coding mode to be efficient. geom_planar_mode_th[i] is an integer in the range 0 . . . 127.

geometry_angular_mode_flag equal to 1 indicates that the angular coding mode is activated. geometry_angular_mode_flag equal to 0 indicates that the angular coding mode is not activated.

geom_angular_origin_xyz[k] specifies the k-th component of the (x, y, z) co-ordinate of the origin used in the processing of the angular coding mode. When not present, geom_angular_origin_x, geom_angular_origin_y, and geom_angular_origin_z are inferred to be 0.

The array geomAngularOrigin, with values geomAngularOrigin[k], for k=0 . . . 2, represents the values of geom_angular_origin_xyz permuted into the coded geometry axis order as follows:
   geomAngularOrigin[XyzToStv[k]]=
   geom_angular_origin_xyz[k], for k=0 . . . 2 number_lasers specifies the number of lasers used for the angular coding mode. When not present, number_lasers is inferred to be 0.

laser_angle[i] and laser_angle_diff[i], for i in the range 0 . . . number_lasers_minus1, specify the tangent of the elevation angle of the i-th laser relative to the horizontal plane defined by the first and second coded axes. When not present, laser_angle[i] is inferred to be 0.

laser_correction[i] and laser_correction_diff[i], for i in the range 0 . . . number_lasers_minus1, specifies the correction, along the second internal axis, of the i-th laser position relative to the geomAngularOrigin[2]. When not present, laser_correction[i] is inferred to be 0.

The arrays LaserAngle and LaserCorrection, with elements laserAngle[i] and LaserCorrection[i], for i in the range of 0 . . . number_lasers_minus1, are derived as follows:

```
LaserAngle[0] = laser_angle[0]
LaserCorrection[0] = laser_correction[0]
for (i = 1; i <= number_lasers_minus1; i++) {
    LaserAngle[i] = LaserAngle[i − 1] + laser_angle_diff[i]
    LaserCorrection[i] = LaserCorrection[i − 1] +
    laser_correction_diff[i]
}
``` planar_buffer_disabled_flag equal to 1 indicates that tracking the closest nodes using a buffer is not used in the process of coding the planar mode flag and the plane position in the planar mode. planar_buffer_disabled_flag equal to 0 indicates that tracking the closest nodes using a buffer is used. When not present, planar_buffer_disabled_flag is inferred to be 0.

The data syntax of the planar mode and direct mode (IDCM) is included in Table 3 and Table 4, respectively.

TABLE 3

Planar mode data syntax

| | Descriptor |
|---|---|
| geometry_planar_mode_data( childIdx, axisIdx ) { | |
|     is_planar_flag[ childIdx ][ axisIdx ] | ae(v) |
|     if( is_planar_flag[ childIdx ][ axisIdx ] ) | |
|         plane_position[ childIdx ][ axisIdx ] | ae(v) |
| } | | is_planar_flag[childIdx][axisIdx] equal to 1 indicates that the positions of the current node's children form a single plane perpendicular to the axisIdx-th axis. is_planar_flag[axisIdx] equal to 0, when present, indicates that the positions of the current node's children occupy both planes perpendicular to the axisIdx-th axis.

plane_position[childIdx][axisIdx] equal to 0 indicates that the position of the plane for the planar mode is the lower position relative to increasing axisIdx-th coordinates. plane_position[axisIdx] equal 1 indicates that the position of the plane for the planar mode is the higher position relative to increasing axisIdx-th co-ordinates. When not present, plane_position[axisIdx] is inferred to be 0.

TABLE 4

Direct mode data syntax

| | Descriptor |
|---|---|
| geometry_direct_mode_data( child ) { | |
|   direct_mode_flag | ae(v) |
|   if( direct_mode_flag ) { | |
|     direct_point_cnt_eq2_flag | ae(v) |
|     if( !geom_unique_points_flag | |
| &&  !direct_point_cnt_eq2_flag) { | |
|       direct_dup_point_cnt_eq0_flag | ae(v) |
|       if( !direct_point_cnt_eq1_flag) { | |
|         direct_dup_point_cnt_eq1_flag | ae(v) |
|         if( direct_dup_point_cnt_eq1_flag ) | |
|           direct_dup_point_cnt_minus2 | ae(v) |
|       } | |
|     } | |
|     for( i = 0; i <= direct_point_cnt_eq2_flag; i++){ | |
|       for( k = 0; k < 3; k++ ) { | |

TABLE 4-continued

Direct mode data syntax

| | Descriptor |
|---|---|
| geometry_direct_mode_data( child ) { | |
|   if( ChildNodeSizeLog2[ k ] >= 1 | |
| && ( !is_planar_flag[ child ][ k ] | |
|     \|\| !geom_tree_coded_axis_flag[ k ])) { | |
|     point_offset[ i ][ k ][ 0 ] | ae(v) |
|     if( geometry_angular_mode_flag) { | |
|       laser_residual_eq0_flag | ae(v) |
|       if( !laser_residual_eq0_flag) { | |
|         laser_residual_sign | ae(v) |
| laser_residual_eq1_flag | |
| if( !laser_residual_eq1_flag ) { | |
| laser_residual_eq2_flag | ae(v) |
| if( !laser_residual_eq2_flag) | |
| laser_residual_minus3 | ae(v) |
|       } | |
|     } | |
|   } | |
|   for( j = 1; j < EffectiveChildNodeSizeLog2[ k ]; j++ ) | |
|     point_offset[ i ][ k ][ j ] | ae(v) |
|   } | |
| } | |
| } | |

In Table 4, laser_residual_eq0_flag, laser_residual_sign, laser_residual_eq1_flag, laser_residual_eq2_flag, and laser_residual_minus3 together specify the residual laser index value associated with a node that uses the IDCM when geometry_angular_enabled_flag is equal to 1.

Beyond merely determining whether a node is eligible to be encoded using a planar mode, G-PCC encoder 200 and G-PCC decoder 300 may determine whether the node is eligible to be encoded using an angular planar coding mode. In general, a node that is eligible to be encoded using a planar mode is not eligible to be encoded using an angular planar coding mode if the node is intersected by two or more lasers. In general, a node that is eligible to be encoded using a planar mode is not eligible to be encoded using an azimuthal planar coding mode if the node contains two or more laser sampling locations (for planar mode using a plane perpendicular to a horizontal axis). The angular planar coding mode may be considered to be disabled with respect to a node if the node is not eligible to be encoded using the angular planar coding mode. Likewise, the azimuthal planar coding mode may be considered to be disabled with respect to a node if the node is not eligible to be encoded using the azimuthal planar coding mode. The following description describes a process for determining the eligibility of a node to be encoded using an angular planar coding mode.

3.3.2 Determination of the Angular Eligibility for a Node

The following process applies to a child node Child to determine the angular eligibility angular_eligible[Child] of the child node. If geometry_angular_mode_flag is equal to 0, angular_eligible[Child] is set to equal to 0. Otherwise, the following applies:

```
midNodeS = 1 << (Max(1, ChildNodeSizeLog2[0]) − 1)
midNodeT = 1 << (Max(1, ChildNodeSizeLog2[1]) − 1)
sLidar = Abs(((sNchild − geomAngularOrigin[0] + midNodeS) << 8) −
128)
tLidar = Abs(((tNchild − geomAngularOrigin[1] + midNodeT) << 8) −
128)
rL1 = (sLidar + tLidar) >> 1
deltaAngleR = deltaAngle × rL1
midNodeV = 1 << (Max(1, ChildNodeSizeLog2[2]) − 1)
```

```
if (deltaAngleR <= (midNodeV << 26))
    angular_eligible[Child] = 0
else
    angular_eligible[Child] = 1
``` where deltaAngle is the minimum angular distance between the lasers determined by

```
deltaAngle = Min{ Abs (LaserAngle [i] – LaserAngle [j]) ; 0 ≤
i < j < number_lasers } ,
``` and where (sNchild, tNchild, vNchild) specify the position of the geometry octree child node Child in the current slice. The term ChildNodeSizeLog2 indicates the log-base-2 of a size of the node "Child."

As part of a process to determine a context for the angular planar coding mode, G-PCC encoder 200 and G-PCC decoder 300 may determine a laser index (e.g., laserIndex) for a node. The laser index for a node is an index of a laser that intersects the node. The following text describes a process for determining the laser index.

3.3.3 Angular Mode Enhancement for Planar Mode: Laser Index laserIndex Associated with a Node The following process applies to a child node Child to determine the laser index laserIndex[Child] associated with the child node.

If the angular eligibility angular eligible[Child] is equal to 0, then laserIndex[Child] index is set to a preset value UNKNOWN_LASER.

Otherwise, if the angular eligibility angular_eligible[Child] is equal to 1, the following applies as a continuation of the process described in 8.2.5.1. Firstly, the inverse rInv of the radial distance of the child node from the Lidar is determined as:

```
r2 = sLidar × sLidar + tLidar × tLidar
rInv = invSqrt(r2)
``` then an angle theta32 is determined for the child node.

```
vLidar = ((vNchild – geomAngularOrigin [2] + midNodeT << 1)
    – 1
theta = vLidar × rInv
theta32 = theta >= 0 ? theta >> 15 : –((–theta) >> 15)
```

In the text above, invSqrt( ) indicates the inverse square root function.

G-PCC encoder 200 and G-PCC decoder 300 may determine the angular eligibility and the laser (laserIndex) associated with the child node as follows, based on the parent node Parent of the child node.

```
laserIndex[Child] = UNKNOWN_LASER
if (laserIndex[Parent] == UNKNOWN_LASER | | deltaAngleR <=
(midNodeV << (26 + 2))) {
    minDelta = 1 << (18 + 7)
    for (j = 0; j < number_lasers; j++) {
        delta = Abs(LaserAngle[j] – theta32)
        if (delta < minDelta) {
            minDelta = delta
```

```
            laserIndex[Child] = j
        }
    }
}
```

After determining the laser index for the node, G-PCC encoder 200 and G-PCC decoder 300 may perform a process to determine a context index (e.g., contextAngular) that indicates a context that G-PCC encoder 200 and G-PCC decoder 300 may use for arithmetic encoding (e.g., CABAC encoding) and arithmetic decoding (e.g., CABAC decoding) plane position syntax elements and/or point offset (e.g., point_offset) syntax elements. The following text describes an example process for determining contextAngular for a node.

3.3.4 Angular Mode Enhancement for Planar Mode: Determination of the Context contextAngular for Planar Coding Mode The following process applies to a child node Child to determine the angular context contextAngular[Child] associated with the child node.

If the laser index laserIndex[Child] is equal to UNKNOWN_LASER, then contextAngular[Child] is set to a preset value UNKNOWN_CONTEXT. Otherwise, if the laser index laserIndex[Child] is not equal to UNKNOWN_LASER, the following applies as a continuation of the process described in 8.2.5.2 of G-PCC DIS, ISO/IEC JTC1/SC29/WG11 w19328, Teleconference (previously Alpbach meeting), April 2020.

Firstly, two angular differences thetaLaserDeltaBot and thetaLaserDeltaTop relative to a lower plane and an upper plane are determined.

```
thetaLaserDelta = LaserAngle [laserIndex [Child]] –theta32
Hr = LaserCorrection [laserIndex [Child]] × rInv;
thetaLaserDelta += Hr >= 0 ? –(Hr >> 17) : ((–Hr) >> 17)
vShift =(rInv << ChildNodeSizeLog2 [2]) >> 20
thetaLaserDeltaTop = thetaLaserDelta – vShift
thetaLaserDeltaBot = thetaLaserDelta + vShift
```

Then, the angular context (contextAngular) is deduced from the two angular differences.

```
contextAngular[Child] = thetaLaserDelta < 0
if (thetaLaserDeltaTop >= 0 | | thetaLaserDeltaBot < 0)
    contextAngular[Child] += 2
```

Figure 7:
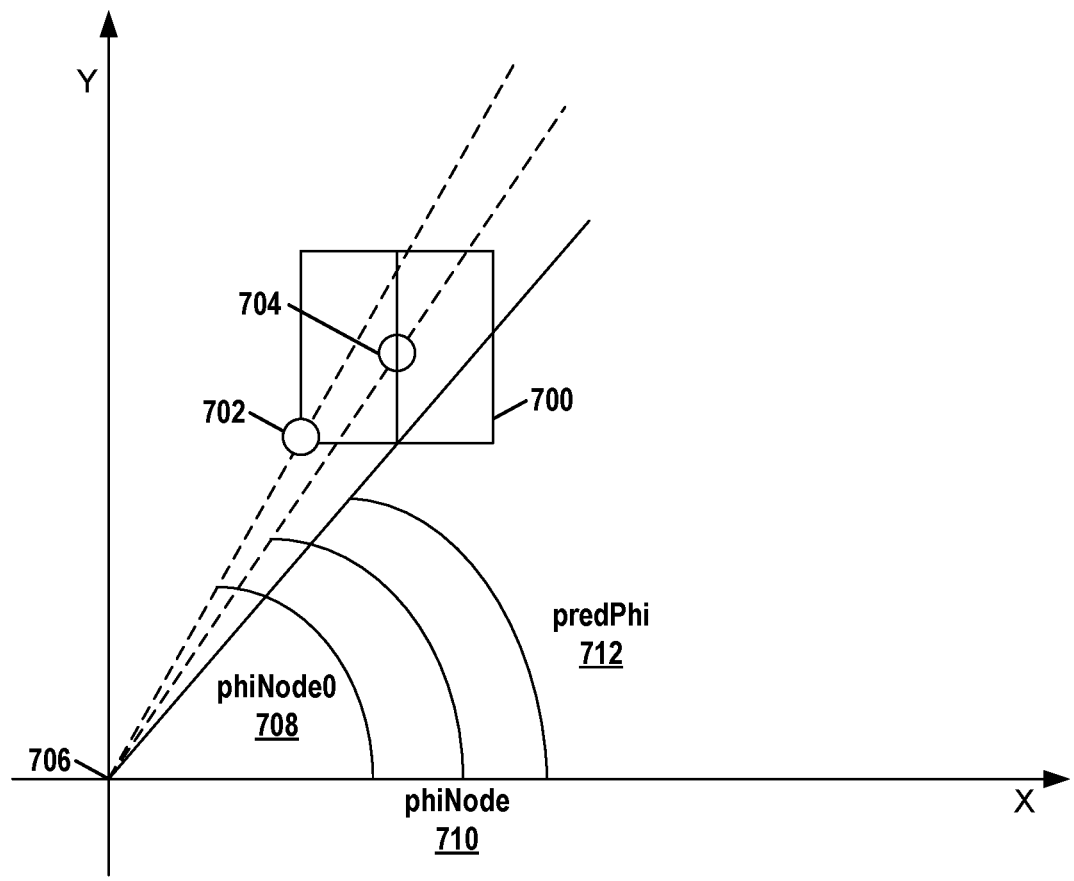
FIG. 7 is a conceptual diagram depicting an example definition of angles used in context derivation of azimuthal planar coding mode, with planarX illustrated.

FIG. 7 is a conceptual diagram depicting an example definition of angles used in context derivation of azimuthal planar coding mode, with planarX illustrated. Specifically, the example of FIG. 7 shows a node 700 having an origin point 702 and a center point 704. Origin point 702 of node 700 is a point closest to an origin point 706 (e.g., geomAngularOrigin) of a coordinate system. Center point 704 of node 700 is a point midway between all boundaries of node 700. A node origin angle 708 (phiNode0) is an angle, relative to a first axis (e.g., x) of a line passing from origin point 706 of the coordinate system through origin point 702 of node 700. A node center anger angle 710 (phiNode) is an angle, relative to the first axis (e.g., x) of a line passing from origin point 706 of the coordinate system through center point 704 of node 700. An angle 712 (predPhi) is an angle of the closest laser to node 700. In other words, angle 712 may be an azimuthal angle of the laser indicated by the laser index for node 700.

G-PCC encoder 200 and G-PCC decoder 300 may use the angles described in FIG. 7 to determine the contexts for arithmetic encoding (e.g., CABAC encoding) and arithmetic decoding (e.g., CABAC decoding) plane position syntax elements (plane_position) for azimuthal planar coding modes. For instance, the following pseudocode describes an example process for determining an azimuthal context for coding plane position syntax elements. The following pseudocode is an excerpt from the software test model (TMC13v10.0) described in "G-PCC Test Model v10", ISO/IEC JTC1/SC29/WG11 w19323, Teleconference, April 2020.

```
// azimuthal context for planar x or y
    angleL = phiNode0 - predPhi //note: predPhi corresponds
with nearest laser to node
    angleR = phiNode - predPhi
    contextAnglePhi = (angleL >= 0 && angleR >= 0) ||
(angleL < 0 && angleR < 0) ? 2 : 0
    angleL = abs (angleL)
    angleR = abs (angleR)
    if (angleL > angleR) {
       contextAnglePhi++
       temp = angleL
       angleL = angleR
       angleR = temp
    }
    if (angleR > (angleL << 1))
       contextAnglePhi += 4
    if (angleR > (angleL << 2))
       contextAnglePhi += 4
    if (angleR > (angleL << 4))
       contextAnglePhi += 4
    if (abs(posx) <= abs (posy))
       contextAnglePhiX = contextAnglePhi
    else
       contextAnglePhiY = contextAnglePhi
```

In the pseudocode above, the variable contextAnglePhiX is a context index for a context used for arithmetic coding of a horizontal plane position for a plane perpendicular to the x axis of a coordinate system. The variable contextAnglePhiY is a context index for a context used for arithmetic coding of a horizontal plane position for a plane perpendicular to the y axis of the coordinate system. The x axis and the y axis are considered to be horizontal axes.

G-PCC encoder 200 and G-PCC decoder 300 may determine a laser index for use in determining a context for arithmetic encoding and arithmetic decoding of vertical point offset syntax elements in IDCM. A vertical point offset syntax element indicates an offset in a vertical (z-axis) direction of a point in a node relative an origin point of the node. The process for determining the laser index for arithmetic encoding and arithmetic decoding vertical point offset syntax elements may be different from the process for determining the laser index for arithmetic encoding and arithmetic decoding plane position syntax elements. The following text describes an operation for determining a laser index for arithmetic encoding and arithmetic decoding vertical point offset syntax elements.

3.3.5 Angular Mode Enhancement for IDCM: Determination of the Laser Index

The process to determine the laser index laserIndex[Child] for a child node Child that undergoes Inferred Direct Coding Mode is described in this section. This applies only when is geometry_angular_mode_flag equal to 1.

Firstly, the estimate laserIndexEstimate[Child] is computed by determining a node angle NodeTheta

```
sNode = (sNchild - geomAngularOrigin[0]) << 8
tNode = (tNchild - geomAngularOrigin[1]) << 8
r2 = sNode × sNode + tNode × tNode
rInvLaser = invSqrt(r2)
NodeTheta = ((vNchild - geomAngularOrigin[2]) * rInvLaser) >> 14
``` and determining the closest laser angle LaserAngle[laserIndexEstimate[Child] ] to this node angle

```
start = 0
end = number_lasers - 1
for (int t = 0; t <= 4; t++) {
    mid = (start + end) >> 1
    if (LaserAngle[mid] > NodeTheta)
        end = mid
    else
        start = mid
}
minDelta = Abs(thetaList[start] - NodeTheta)
laserIndexEstimate[Child] = start
for (j = start + 1; j <= end; j++) {
    delta = Abs(LaserAngle[j] - NodeTheta)
    if (delta < minDelta) {
        minDelta = delta
        laserIndexEstimate[Child] = j
    }
}
```

Secondly, a laser index residual laserIndexResidual[Child] is deduced from the decoded values

```
laserIndexResidual [Child] = 0
if (!laser_residual_eq0_ flag) {
    residue = 1
    if (!laser_residual_eq1_flag) {
        residue = 2
        if (!laser_residual_eq2_ flag) {
            residue = 3 + laser_residual_minus3
        }
    }
    if (laser_residual_sign)
        laserIndexResidual [Child] = residue
    else
        laserIndexResidual [Child] = -residue
}
```

The laser index laserIndex[Child] is then obtained by the sum
    laserIndex[Child]=laserIndexEstimate[Child]+laserIndexResidual[Child]

In the text above, thetaList is a list containing tangents of the laser angles.

Furthermore, after determining the laser index for arithmetic encoding and arithmetic decoding point offset syntax elements, G-PCC encoder 200 and G-PCC decoder 300 may use the laser index to determine a context (idcmIdxAngular) for arithmetic encoding and arithmetic decoding vertical point offset syntax elements. The following text describes an operation for determining the context (idcmIdxAngular) for arithmetic encoding and arithmetic decoding vertical point offset syntax elements.

3.3.6 Angular Mode Enhancement for IDCM: Determination of the Angular Context idcmIdxAngular The process to determine the context idcmIdxAngular[i][j] for coding the bin point offset[i][2][j] associated with j-th bit of the i-th point belonging to the child node that undergoes Inferred Direct Coding Mode is described in this section which is a continuation of the preceding section.

This process is performed after point offset[i][0][j] and point offset[i][1][j] are decoded such that PointOffset[i][0] and PointOffset[i][1] are known. The s and t position, relative to the LIDAR, of the point i is determined by:

```
posSlidar [i] = sNchild – geomAngularOrigin [0] +
    PointOffset [i] [0]
posTlidar [i] = tNchild – geomAngularOrigin [1] +
    PointOffset [i] [1]
``` where (sNchild, tNchild, vNchild) specifying the position of the geometry octree child node Child in the current slice. The inverse rInv of the radial distance of the point from the LIDAR is determined by:

```
sLidar = (posSlidar [i] << 8) – 128
tLidar = (posTlidar [i] << 8) – 128
r2 = sLidar × sLidar + tLidar × tLidar
rInv = invSqrt(r2)
```

The corrected laser angle ThetaLaser of the laser associated with the child nodeChild is determined by:

```
Hr = LaserCorrection[laserIndex[Child]] × rInv
ThetaLaser = LaserAngle[laserIndex [Child]] + (Hr >= 0 ?
    –(Hr >> 17) : ((–Hr) >> 17))
```

Assuming that the bits point offset[i][2][j2] for j2=0 . . . j−1, are known, the point is known to belong to a virtual vertical interval whose half size is provided by:

```
halfIntervalSize [j] = (1 << (EffectiveChildNodeSizeLog2 [2]
    – 1)) >> j
``` and a partial v point position posVlidarPartial[i][j], that provides the lower end of the interval, is deduced by:

```
PointOffsetVpartial = 0 ;
for (j2 = 0; j2 < j; j2++)
    PointOffsetVpartial [i] += point_offset [i] [2] [j2] << j2
PointOffsetVpartial [i] <<= (EffectiveChildNodeSizeLog2 [2] –
    j)
    posVlidarPartial [i] [j] = vNchild – geomAngularOrigin [2] +
        PointOffsetVpartial [i]
```

A relative laser position thetaLaserDeltaVirtualInterval relative to the middle of the virtual interval is computed by:

```
vLidar = ((posVlidarPartial [i] [j] + halfIntervalSize [j] ) <<
    1) – 1
theta = zLidar × rInv
theta32 = theta >= 0 ? theta >> 15 : –((–theta) >> 15)
thetaLaserDeltaVirtualInterval = ThetaLaser – theta32;
```

Two angular differences, deltaVirtualIntervalTop and deltaVirtualIntervalBot, of the laser relative to a lower and an upper v position in the virtual interval are determined.

```
vShift = ((rInv << EffectiveChildNodeSizeLog2[2]) >> 18) >>
    j
```

```
deltaVirtualIntervalTop = thetaLaserDeltaVirtualInterval –
    vShift
deltaVirtualIntervalBot = thetaLaserDeltaVirtualInterval
    vShift
```

Then, the angular context is deduced from the two angular differences.

```
idcmIdxAngular [i] [j] = thetaLaserDeltaVirtualInterval < 0
if (deltaVirtualIntervalTop >= 0 | | deltaVirtualIntervalBot
    < 0)
    idcmIdxAngular [i] [j] += 2
```

When IDCM is applied to a child node Child, the bits point offset[i][2][j] of the i-th point in the child node, for j in the range 0 . . . EffectiveChildNodeSizeLog2[2] or in the range 1 . . . EffectiveChildNodeSizeLog2[2] in case the first bit is inferred by the plane position plane_position[Child][2], are decoded applying the following process.

If geometry_angular_mode_flag is equal to 0, then the bit point offset[i][2][j] is decoded using the bypass decoding process.

Otherwise, if geometry_angular_mode_flag is equal to 0, the bit point_offset[i][2][0] is bypass decoded when not inferred by the plane position, and the bits point_offset[i][2][j] are decoded using the context idcmIdxAngular[i][j] for j>0.

Figure 8:
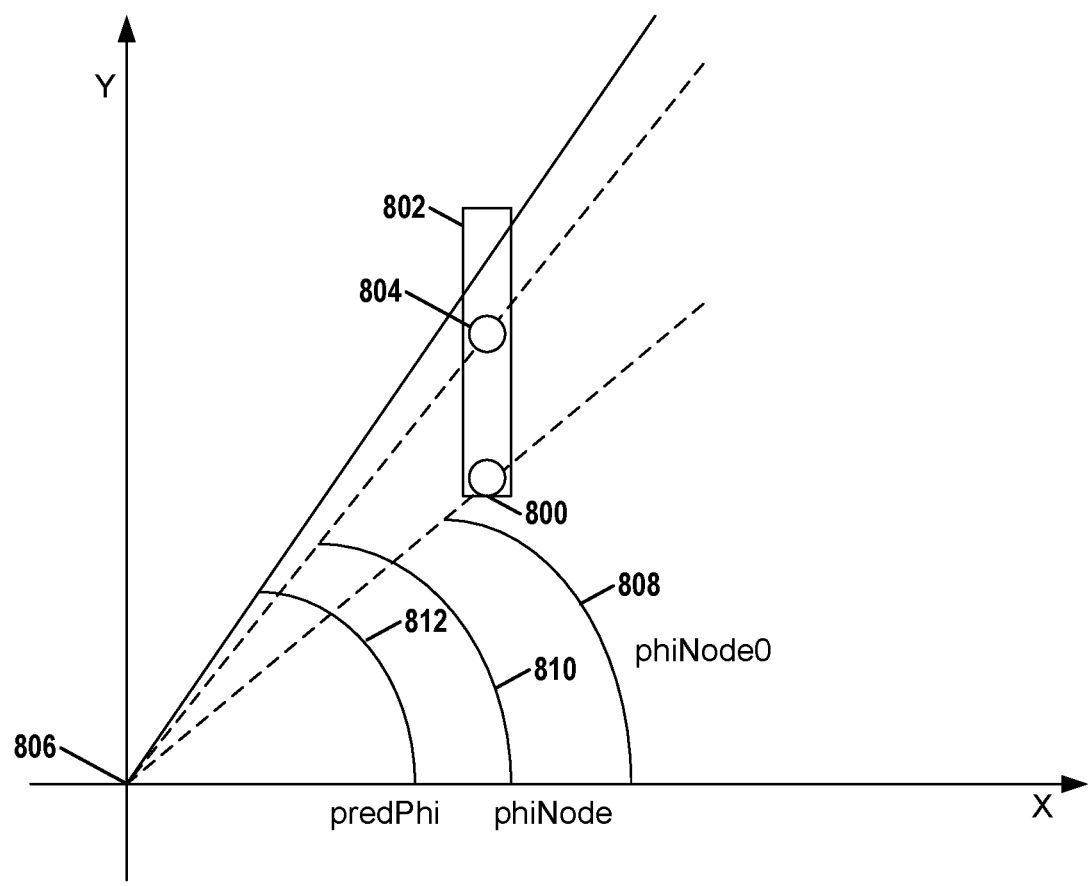
FIG. 8 is a conceptual diagram depicting an example definition of angles used in context derivation of azimuthal mode, with y-inferred direct coding mode (IDCM) illustrated.

FIG. 8 is a conceptual diagram depicting an example definition of angles used in context derivation of azimuthal mode, with y-IDCM illustrated. The example of FIG. 8 shows an origin point 800 of a node 802 and a center point 804 of node 802. Only points along a closer x-axis boundary of node 802 are shown in the example of FIG. 8. Origin point 800 of node 802 is a point closest to an origin point 806 (e.g., geomAngularOrigin) of a coordinate system. Center point 804 of node 802 is a point midway between a closer and a further y-axis boundaries of node 802. The y-axis boundaries of node 802 are perpendicular to the y-axis. A node origin angle 808 (phiNode0) is an angle, relative to a first axis (e.g., x) of a line passing from origin point 806 of the coordinate system through origin point 800 of node 802. A node center angle 810 (phiNode) is an angle, relative to the first axis (e.g., x) of a line passing from origin point 806 of the coordinate system through center point 804 of node 802. An angle 812 (predPhi) is an angle of the closest laser to node 802. In other words, angle 812 may be an azimuthal angle of the laser indicated by the laser index for node 700.

G-PCC encoder 200 and G-PCC decoder 300 may use the angles described in FIG. 8 to determine a context to use for arithmetic encoding and arithmetic decoding azimuthal point offset syntax elements. An azimuthal point offset syntax element may be an x-axis azimuthal point offset syntax element or a y-axis azimuthal point offset syntax element. An x-axis azimuthal point offset syntax element indicates an offset in an x-axis direction (which is one of the horizontal directions) for a point in a node relative to an origin point of the node. A y-axis azimuthal point offset syntax element indicates an offset in a y-axis direction (which is one of the horizontal directions) for a point in a node relative to an origin point of the node. G-PCC encoder 200 and G-PCC decoder 300 may determine an azimuthal context for coding a point_offset syntax element using the following code excerpt from the software test model (TMC13v10.0) and the illustration in FIG. 8:

```
// azimuthal context for IDCM
    angleL = phiL − predPhi
    angleR = phiR − predPhi
    contextAnglePhi = (angleL >= 0 && angleR >= 0) | |
(angleL < 0 && angleR < 0) ? 2 : 0
    angleL = abs (angleL)
    angleR = abs (angleR)
    if (angleL > angleR) {
        contextAnglePhi ++
        int temp = angleL
        angleL = angleR
        angleR = temp
    }
    if (angleR > (angleL << 1))
        contextAnglePhi += 4
    if (angleR > (angleL << 2))
        contextAnglePhi += 4
    if (angleR > (angleL << 4))
        contextAnglePhi += 4
```

As described above with respect to the sections describing the operation for determining contextAngular for planar coding mode and the operation for determining the angular context idcmIdxAngular, the determination of the azimuthal context indices for coding the planar mode's horizontal (x or y) plane position and for coding the IDCM horizontal (x or y) point position offsets may involve significant complexity. For example:

16 contexts are used for coding the planar mode's horizontal (x or y) plane position.

16 contexts are used for coding IDCM's horizontal (x or y) point offsets.

4 conditions based on comparisons of two large integer values are used to determine each context index.

As described above with respect to the sections describing the operation for determining ctxIdx for the planar mode flag (e.g., is_planar_flag) and the operation for determining ctxIdx for the plane position syntax element (e.g., plane_position) when angular and azimuthal planar coding modes are disabled, the processes for determining the contexts for arithmetic encoding and arithmetic decoding the planar mode flag and plane position syntax elements involve significant complexity. For example:

4 contexts per axis (3x) are used for coding the planar mode flag.

24 contexts per axis (3x) are used for coding the plane position syntax element.

This disclosure describes techniques that may reduce the complexity associated with determining contexts for arithmetic coding the planar mode's horizontal plane position (e.g., the plane position syntax element for the x-axis and the y-axis) and coding the IDCM horizontal point position offsets (e.g., point offset syntax elements indicating offsets in the x-axis and y-axis of points in a node). Reducing the complexity associated with determining these azimuthal context indices may reduce the cost of implementing hardware for G-PCC encoder 200 and G-PCC decoder 300. Additionally, reducing the complexity associated with determining these azimuthal context indices may accelerate encoding and decoding times of point cloud data. As described below, the techniques of this disclosure may allow for fewer contexts to reduce the complexity associated with determining a context for arithmetic coding a planar mode's horizontal plane position and determining a context for arithmetic coding an IDCM horizontal point position offset.

The following examples and pseudocode reference sections of this disclosure above related to the determination of the context contextAngular for planar coding mode") and determination of the angular context idcmIdxAngular. For instance, terms and variables used in the following examples and pseudocode may be defined as described in these sections of this disclosure. One or more examples disclosed in this document may be applied independently or combined.

In a first example of reducing the number of contexts for coding the planar mode's horizontal plane position and/or the x or y point offsets in IDCM, G-PCC encoder 200 and G-PCC decoder 300 may determine a context from a plurality of contexts consisting of 2 contexts. The following pseudocode is consistent with an example in which the plurality of contexts consists of 2 contexts.

```
// azimuthal context for planar x or y
    angleL = phiNode0 − predPhi //note: predPhi corresponds
with nearest laser to node
    angleR = phiNode − predPhi
    contextAnglePhi = (angleL >= 0 && angleR >= 0) | |
(angleL < 0 && angleR < 0) ? 1 : 0
    if (abs(posx) <= abs (posy))
        contextAnglePhiX = contextAnglePhi
    else
        contextAnglePhiY = contextAnglePhi
```

The variable contextAnglePhi in this first example can have one of only 2 potential values (i.e., 0 or 1, depending on whether (angleL>=0 && angleR>=0) (angleL<0 && angleR<0)). In contrast, the process for determining contextAnglePhiX or contextAnglePhiY described in w19328 can have one of 16 potential values.

In a second example of reducing the number of contexts for coding the planar mode's horizontal plane position and/or the x or y point offsets in IDCM, G-PCC encoder 200 and G-PCC decoder 300 may determine a context from a plurality of contexts consisting of 4 contexts. The following pseudocode is consistent with an example in which the plurality of contexts consists of 4 contexts.

```
// azimuthal context for planar x or y
    angleL = phiNode0 − predPhi //note: predPhi corresponds
with nearest laser to node
    angleR = phiNode − predPhi
    contextAnglePhi = (angleL >= 0 && angleR >= 0) | |
(angleL < 0 && angleR < 0) ? 2 : 0
    angleL = abs (angleL)
    angleR = abs (angleR)
    if (angleL > angleR) {
        contextAnglePhi++
    }
    if (abs(posx) <= abs (posy))
        contextAnglePhiX = contextAnglePhi
    else
        contextAnglePhiY = contextAnglePhi
```

The variable contextAnglePhi in this second example can have one of only 4 potential values (i.e., 0, 1, 2, or 3), depending on whether (angleL>=0 && angleR>=0) (angleL<0 && angleR<0) and whether angleL>angleR). In contrast, the process for determining contextAnglePhiX or contextAnglePhiY described in section 3.3.4 can have one of 16 potential values.

In a third example of reducing the number of contexts for coding the planar mode's horizontal plane position and/or the x or y point offsets in IDCM, G-PCC encoder 200 and G-PCC decoder 300 may determine a context from a plurality of contexts consisting of 8 contexts. The following pseudocode is consistent with an example in which the plurality of contexts consists of 8 contexts.

```
// azimuthal context for planar x or y
    angleL = phiNode0 - predPhi //note: predPhi corresponds
with nearest laser to node
    angleR = phiNode - predPhi
    contextAnglePhi = (angleL >= 0 && angleR >= 0) ||
(angleL < 0 && angleR < 0) ? 2 : 0
    angleL = abs (angleL)
    angleR = abs (angleR)
    if (angleL > angleR) {
        contextAnglePhi++
        temp = angleL
        angleL= angleR
        angleR = temp
    }
    if (angleR > (angleL << 1))
        contextAnglePhi += 4
    if (abs(posx) <= abs (posy))
        contextAnglePhiX = contextAnglePhi
    else
        contextAnglePhiY = contextAnglePhi
```

The variable contextAnglePhi in this third example can have one of only 8 potential values (i.e., 0 through 7, depending on whether (angleL>=0 && angleR>=0) (angleL<0 && angleR<0), whether angleL>angleR, and whether angleR>(angleL<<1)). In contrast, the process for determining contextAnglePhiX or contextAnglePhiY described in section 3.3.4 can have one of 16 potential values.

Or alternatively with modified threshold value:

```
// azimuthal context for planar x or y
    angleL = phiNode0 - predPhi //note: predPhi corresponds
with nearest laser to node
    angleR = phiNode - predPhi
    contextAnglePhi = (angleL >= 0 && angleR >= 0) ||
(angleL < 0 && angleR < 0) ? 2 : 0
    angleL = abs (angleL)
    angleR = abs (angleR)
    if (angleL > angleR) {
        contextAnglePhi++
        temp = angleL
        angleL = angleR
        angleR = temp
    }
    if (angleR > (angleL << 2))
        contextAnglePhi += 4
    if (abs(posx) <= abs (posy))
        contextAnglePhiX = contextAnglePhi
    else
        contextAnglePhiY = contextAnglePhi
```

The variable contextAnglePhi in this alternative version of the third example can have one of only 8 potential values (i.e., 0 through 7, depending on whether (angleL>=0 && angleR>=0) (angleL<0 && angleR<0), whether angleL>angleR, and whether angleR>(angleL<<2)). In contrast, the process for determining contextAnglePhiX or contextAnglePhiY described in section 3.3.4 can have one of 16 potential values.

Thus, in the alternative version of the third example, a G-PCC coder (e.g., G-PCC encoder 200 or G-PCC decoder 300) may determine a first-axis position (e.g., posx) as a difference between a first-axis coordinate of an origin point of the node and a first-axis coordinate of an origin point of the coordinate system. The G-PCC coder may determine a second-axis position (e.g., posy) as a difference between a second-axis coordinate of the origin point of the node and a second-axis coordinate of the origin point of the coordinate system. Furthermore, the G-PCC coder may determine a first angle (e.g., angleL) as a difference between a node origin angle (e.g., phiNode0) and a laser angle (e.g., predPhi). The node origin angle is an angle, relative to the first axis of the coordinate system, of a line passing from the origin point of the coordinate system through an origin point of the node. The laser angle is an angle, relative to the first axis, of an applicable laser originating at the origin point of the coordinate system. The applicable laser is the closest laser to the node.

Additionally, the G-PCC coder may determine a second angle (e.g., angleR) as a difference between a node center angle (e.g., phiNode) and the laser angle (e.g., predPhi). The node center angle is an angle, relative to the first axis of the coordinate system, of a line passing from the origin point of the coordinate system through a center point of the node. The G-PCC coder may set an azimuth angle context value (e.g., contextAnglePhi) to either 2 or 0 depending on whether both the first angle and the second angle are non-negative or both the first angle and the second angle are negative (e.g., (angleL>=0 && angleR>=0) (angleL<0 && angleR<0). The G-PCC coder may then set the first angle to an absolute value of the first angle and set the second angle to an absolute value of the second angle.

Based on the first angle being greater than the second angle, the G-PCC coder may increment the azimuth angle context value by 1 (e.g., contextAnglePhi++). The G-PCC coder may set a temporary value (temp) to the first angle. The G-PCC coder may also set the first angle to the second angle (e.g., angleL=angleR). The G-PCC coder may then set the second angle to the temporary value (e.g., angleR=temp).

Furthermore, based on the second angle being greater than a shifted value, the G-PCC coder may increment the azimuth angle context value by 4. In this example, the shifted value is equal to the first angle left shifted by 2. Thus, the G-PCC coder may perform if (angleR>(angleL<<2)) contextAnglePhi+=4.

Based on an absolute value of the first-axis position (e.g., abs(posx)) being less than or equal to an absolute value of the second-axis position (e.g., abs(posy), the G-PCC coder may set a first-axis azimuth angle context value (e.g., contextAnglePhiX) to the context angle value. Alternatively, based on the absolute value of the first-axis position (e.g., abs(posx)) being greater than the absolute value of the second-axis position (e.g., abs(posy), the G-PCC coder may set a second-axis azimuth angle context value (e.g., contextAnglePhiY) to the context angle value. The G-PCC coder may then determine the context based on the first-axis azimuth angle context value or the second-axis azimuth context value. For instance, the G-PCC coder may determine that the context is a context identified by the first-axis azimuth angle context value or the second-axis azimuth context value, or a context identified by a value mathematically derived from the first-axis azimuth angle context value or the second-axis azimuth context value.

In a fourth example of reducing the number of contexts for coding the planar mode's horizontal plane position and/or the x or y point offsets in IDCM, G-PCC encoder 200 and G-PCC decoder 300 may determine a context from a plurality of contexts consisting of 12 contexts. The following pseudocode is consistent with an example in which the plurality of contexts consists of 12 contexts.

```
// azimuthal context for planar x or y
    angleL = phiNode0 - predPhi //note: predPhi corresponds
with nearest laser to node
    angleR = phiNode - predPhi
    contextAnglePhi = (angleL >= 0 && angleR >= 0) ||
```

```
        (angleL < 0 && angleR < 0) ? 2 : 0
          angleL = abs (angleL)
          angleR = abs (angleR)
          if (angleL > angleR) {
            contextAnglePhi++
            temp = angleL
            angleL = angleR
            angleR = temp
          }
          if (angleR > (angleL << 1))
            contextAnglePhi += 4
          if (angleR > (angleL << 2))
            contextAnglePhi += 4
          if (abs(posx) <= abs (posy))
            contextAnglePhiX = contextAnglePhi
          else
            contextAnglePhiY = contextAnglePhi
```

The variable contextAnglePhi in this fourth example can have one of only 12 potential values (i.e., 0 through 11, depending on whether (angleL>=0 && angleR>=0)||(angleL<0 && angleR<0), whether angleL>angleR, whether angleR>(angleL<<2), and whether angleR>(angleL<<2)). In contrast, the process for determining contextAnglePhiX or contextAnglePhiY described in section 3.3.4 can have one of 16 potential values.

In a fifth example of reducing the number of contexts for coding the planar mode's horizontal plane position and/or the x or y point offsets in IDCM, G-PCC encoder 200 and G-PCC decoder 300 may determine a context from a plurality of contexts consisting of 6 contexts. The following pseudocode is consistent with an example in which the plurality of contexts consists of 6 contexts.

```
    // azimuthal context for planar x or y
        angleL = phiNode0 - predPhi //note: predPhi corresponds
      with nearest laser to node
        angleR = phiNode - predPhi
        contextAnglePhi = (angleL >= 0 && angleR >= 0) ||
      (angleL < 0 && angleR < 0) ? 2 : 0
        angleL = abs (angleL)
        angleR = abs (angleR)
        if (angleL > angleR) {
          contextAnglePhi++
          temp = angleL
          angleL = angleR
          angleR = temp
        }
        if (contextAnglePhi < 2) {
          if (angleR > (angleL << 2))
            contextAnglePhi += 4;
        }
        if (abs(posx) <= abs (posy))
          contextAnglePhiX = contextAnglePhi
        else
          contextAnglePhiY = contextAnglePhi
```

The variable contextAnglePhi in this fifth example can have one of only 6 potential values (i.e., 0 through 5, depending on whether (angleL>=0 && angleR>=0)||(angleL<0 && angleR<0), whether angleL>angleR, whether contextAnglePhi<2 and whether angleR>(angleL<<2)). In contrast, the process for determining contextAnglePhiX or contextAnglePhiY described in section 3.3.4 can have one of 16 potential values.

Or alternatively:

```
    // azimuthal context for planar x or y
        angleL = phiNode0 - predPhi //note: predPhi corresponds
      with nearest laser to node
        angleR = phiNode - predPhi
        contextAnglePhi = (angleL >= 0 && angleR >= 0) ||
      (angleL < 0 && angleR < 0) ? 2 : 0
        angleL = abs (angleL)
        angleR = abs (angleR)
        if (angleL > angleR) {
          contextAnglePhi++
          temp = angleL
          angleL = angleR
          angleR = temp
        }
        if (contextAnglePhi >= 2) {
          if (angleR > (angleL << 2))
            contextAnglePhi += 4;
        }
        if (abs(posx) <= abs (posy))
          contextAnglePhiX = contextAnglePhi
        else
          contextAnglePhiY = contextAnglePhi
```

The variable contextAnglePhi in this alternate version of the fifth example can have one of only 6 potential values (i.e., 0 through 5, depending on whether (angleL>=0 && angleR>=0)||(angleL<0 && angleR<0), whether angleL>angleR, whether contextAnglePhi>=2, and whether angleR>(angleL<<2)). In contrast, the process for determining contextAnglePhiX or contextAnglePhiY described in section 3.3.4 can have one of 16 potential values.

Thus, in the first through fifth examples above, G-PCC encoder 200 or G-PCC decoder 300 may determine a context for a horizontal plane position from a plurality of contexts, wherein the plurality of contexts consists of 2, 4, 6, 8, or 12 contexts. Additionally, G-PCC encoder 200 or G-PCC decoder 300 may perform arithmetic coding (e.g., CABAC encoding or CABAC decoding) on the horizontal plane position using the determined context. G-PCC encoder 200 or G-PCC decoder 300 may code (e.g., encode or decode) at least one point in a point cloud based on the horizontal plane position.

In each of the first through fifth examples above, G-PCC encoder 200 and G-PCC decoder 300 may determine a context for a horizontal axis point offset syntax element using operations described by the corresponding pseudocode. However, in the operations for determining the context for a horizontal axis point offset syntax element, G-PCC encoder 200 and G-PCC decoder 300 may use contextAnglePhi as a context index identifying the context for the point offset syntax element without evaluating (abs(pos) <=abs(posy)), assigning contextAnglePhi to contextAnglePhiX, or assigning contextAnglePhi to contextAnglePhiY.

Thus, with respect to the third example, a G-PCC coder (e.g., G-PCC encoder 200 and G-PCC decoder 300) may determine a first angle (e.g., angleL) as a difference between a node origin angle (e.g., phiNode0) and a laser angle (e.g., predPhi). The node origin angle is an angle, relative to the first axis of the coordinate system, of a line passing from the origin point of the coordinate system through an origin point of the node. The laser angle is an angle, relative to the first axis, of an applicable laser originating at the origin point of the coordinate system, wherein the applicable laser is a closest laser to the node. In this example, the G-PCC coder may also determine a second angle (e.g., angleR) as a difference between a node center angle (e.g., phiNode) and the laser angle (e.g., predPhi). The node center angle is an angle, relative to the first axis of the coordinate system, of a line passing from the origin point of the coordinate system through a center point of the node. Furthermore, in this example, the G-PCC coder may set a context value (e.g., contextAnglePhi) to either 2 or 0 depending on whether both the first angle and the second angle are non-negative or both the first angle and the second angle are negative. The G-PCC coder may then set the first angle to an absolute value of the first angle and set the second angle to an absolute value of the second angle. Based on the first angle being greater than the second angle, the G-PCC coder may then increment the azimuth angle context value by 1, set a temporary value (e.g., temp) to the first angle, set the first angle to the second angle, and set the second angle to the temporary value. Based on the second angle being greater than a shifted value (e.g., angleL<<2), the G-PCC coder may then increment the azimuth angle context value by 4. The shifted value may be equal to the first angle left shifted by 1 (or in some examples 2). Furthermore, the G-PCC coder may determine, from a second plurality of contexts, a second context based on the azimuth angle context value, wherein the second plurality of contexts consists of 8 contexts. The G-PCC coder may perform arithmetic coding of one or more bits of a horizontal axis point offset using the determined context. The horizontal axis point offset is an x-axis or y-axis coordinate of a point of the node relative to an origin point of the node.

Furthermore, in accordance with some techniques of this disclosure, G-PCC encoder 200 and G-PCC decoder 300 may use a reduced number of contexts for arithmetic encoding (e.g., CABAC encoding) and arithmetic decoding (e.g., CABAC decoding) the planar mode flag (e.g., is_planar_flag). Furthermore, G-PCC encoder 200 and G-PCC decoder 300 may use a reduced number of contexts for arithmetic encoding and arithmetic decoding the plane position syntax elements for the angular coding mode when the angular planar coding mode and the azimuthal planar coding mode are disabled. The following examples and pseudocode reference the sections of this disclosure above related to the determination of ctxIdx for the planar mode flag syntax element and the determination of ctxIdx for the plane position syntax element.

In a sixth example, when the angular planar coding mode and the azimuthal planar coding mode are disabled, G-PCC encoder 200 and G-PCC decoder 300 use one context per axis for coding the planar mode flag syntax element. In other words, the context used for arithmetic coding the planar mode flag syntax element is dependent only on the axis (e.g., x-axis, y-axis, or z-axis) to which the planar mode flag relates.

In this sixth example, G-PCC encoder 200 and G-PCC decoder 300 may derive the context index ctxIdx as follows. Throughout this disclosure, deletions to w19328 are shown with <d> ... </d> tags and emphasized text is indicated with <!> ... </!> tags.

```
ctxIdx = axisIdx <d>+ 3 × neighOccupied + (dist <= 1 ?
    0 : 6)</d>
```

Thus, in this sixth example, G-PCC encoder 200 or G-PCC decoder 300 may determine a context for a syntax element for an axis from a set of contexts, wherein the syntax element indicates whether a current child node is planar in a direction perpendicular to the axis; performing arithmetic coding (e.g., CABAC encoding or CABAC decoding) on the syntax element using the determined context; and code at least one point in a point cloud based on the horizontal plane position.

More specifically, in this sixth example, G-PCC encoder 200 or G-PCC decoder 300 may determine a context index that is equal to an axis index of the first axis regardless of occupancy of a neighbor node (e.g., neighOccupied) or Manhattan distance (e.g., dist) between a position of the node (e.g., childPos) and a position of a most-recently node with a same axis position value for the first axis and regardless of whether tracking of closest nodes using a buffer is used in a process of coding a planar mode flag and plane position (e.g., regardless of a value of geometry_angular_mode_flag). The axis position value for the first axis indicates 14 least significant bits of a first-axis coordinate of the current node. G-PCC encoder 200 may perform arithmetic encoding on a planar flag for the first axis using a context indicated by the context index. G-PCC decoder 300 may perform arithmetic decoding on a planar flag for the first axis using the context indicated by the context index.

In a seventh example, when the angular planar coding mode and the azimuthal planar coding mode are disabled, G-PCC encoder 200 and G-PCC decoder 300 may use 1 context per axis for coding the plane position syntax element. In this seventh example, G-PCC encoder 200 and G-PCC decoder 300 may determine the context index ctxIdx as follows:

```
if (!IsPlanar[axisIdx][axisPos])
    ctxIdx = 0
else {
    <d>distCtxInc = (dist > 1) + (dist > 8)</d>
    ctxIdx = <!>axisIdx</!> <d>+ 3 × neighOccupied + 6 ×
    distCtxInc + 18 × axisOffset + 1</d>
}
```

Or equivalently:

```
if (!IsPlanar [axisIdx][axisPos])
    ctxIdx = 0
else {
    distCtxInc = (dist > 1) + (dist > 8)
    ctxIdx = <!>axisIdx</!> <d>+ 3 × neighOccupied + 6 ×
    distCtxInc + 18 × axisOffset </d><!>+ 1</!>
}
```

In an eighth example, when the angular planar coding mode and the azimuthal planar coding mode are disabled, G-PCC encoder 200 and G-PCC decoder 300 may use a reduced number contexts per axis for coding the plane position syntax element. In this eighth example, G-PCC encoder 200 and G-PCC decoder 300 may determine the context index ctxIdx as follows:

```
if (!IsPlanar[axisIdx][axisPos])
    ctxIdx = 0
else {
    distCtxInc = (dist > 1) + (dist > 8)
    ctxIdx = axisIdx + <d>3 × neighOccupied</d> + 6 ×
    distCtxInc + 18 × axisOffset + 1
}
```

Or several alternative examples or combinations are possible:

```
if (!IsPlanar[axisIdx][axisPos])
    ctxIdx = 0
else {
    distCtxInc = (dist > 1) + (dist > 8)
    ctxIdx = axisIdx + 3 × neighOccupied + <d>6 ×
    distCtxInc</d> + 18 × axisOffset + 1
```

-continued

```
   }
```

In another example:

```
if (!IsPlanar[axisIdx][axisPos]])
   ctxIdx = 0
else {
   distCtxInc = (dist > 1) + (dist > 8)
   ctxIdx = axisIdx + 3 × neighOccupied + 6 × distCtxInc +
   <d>18 × axisOffset</d> + 1
   }
```

Thus, in the seventh and eighth examples of this disclosure where the angular planar azimuthal coding mode and azimuthal planar coding mode are disabled, G-PCC encoder 200 or G-PCC decoder 300 may determine a context for a syntax element for an axis from a set of contexts, wherein the syntax element indicates whether a position of a plan for a planar mode is at a higher or lower position relative to a plane corresponding to the axis; perform arithmetic coding on the syntax element using the determined context; and code at least one point in a point cloud based on the horizontal plane position.

In a ninth example, where the angular planar coding mode and the azimuthal planar coding mode are disabled, G-PCC encoder 200 and G-PCC decoder 300 may use 1 context per axis for coding planar mode flag if planar_buffer_disabled_flag is equal to 1. For instance, Wei Zhang, Zexing Sun, Mary-Luc Champel, "[G-PCC]EE13.37 report on planar coding improvement," ISO/IEC JTC1/SC29/WG11 MPEG/m53693, Teleconference (previously Geneva meeting), June 2020, describes the context derivation for the planar mode flag (e.g., is_planar_flag) as follows:

```
If (planar_buffer_disabled_flag)
{
   ctxIdx = axisIdx + 3 × (!neighOccupied)
}
Else
{
   ...
}
```

It is proposed in this ninth example to further simplify the context derivation in the case that the planar_buffer_disabled_flag syntax element is true (e.g., when tracking the closest nodes using a buffer is not used in the process of coding the planar mode flag and the plane position in the planar mode) as follows, with deletion indicated with <d> . . . </d> tags:

```
If (planar_buffer_disabled_flag)
{
   ctxIdx = axisIdx +<d>3 × (!neighOccupied)</d>
}
Else
{
   ...
}
```

Thus, in this ninth example, G-PCC encoder 200 or G-PCC decoder 300 may determine a context for a syntax element for an axis from a set of contexts, wherein the syntax element indicates whether a current child node is planar in a direction perpendicular to the axis and determining the context comprises determining a context index for the context as being equal to an axis index of the axis; perform arithmetic coding (e.g., CABAC coding) on the syntax element using the determined context; and code at least one point in a point cloud based on the horizontal plane position.

FIG. 9 is a flowchart of an example method for encoding point cloud data, in accordance with one or more techniques of this disclosure. In the example of FIG. 9, G-PCC encoder 200 may determine that occupied child nodes of a node form a single plane perpendicular to a first axis (e.g., an x-axis or y-axis) of a coordinate system (900). The first axis is a horizontal axis. For instance, G-PCC encoder 200 may review locations of points in the point cloud to determine which of the child nodes contain points. In some examples, based on determining that the occupied child nodes of the node form the plane perpendicular to the first axis, G-PCC encoder 200 may omit encoding of child nodes of the node that are not in the plane perpendicular to the first axis. Omitting encoding of the child nodes that are not in the plane perpendicular to the first axis may reduce the amount of data in geometry bitstream 203 and/or attribute bitstream 205.

Additionally, G-PCC encoder 200 may determine a horizontal plane position of the node (902). The horizontal plane position indicates a position of the single plane that is perpendicular to the first axis of the coordinate system. For instance, G-PCC encoder 200 may determine whether the plane perpendicular to the first axis is at a boundary of the node closest along the first axis to the origin point of the coordinate system or whether the plane perpendicular to the first axis passes through a center point of the node.

Furthermore, G-PCC encoder 200 may determine, from a plurality of contexts consisting of 8 contexts, a context for the horizontal plane position of the node (904). For instance, G-PCC encoder 200 may determine the context using the processes described in the third example of reducing the number of contexts for coding the planar mode's horizontal plane position and/or the x or y point offsets in IDCM, as described above.

G-PCC encoder 200 (e.g., geometry arithmetic encoding unit 214 of G-PCC encoder 200) may perform arithmetic encoding on a syntax element indicating the horizontal plane position using the determined context (906). For instance, G-PCC encoder 200 may perform arithmetic encoding on a plane position syntax element (e.g., plane_position). G-PCC encoder 200 may use the CABAC encoding as described above.

In some examples, in addition to or as an alternative to arithmetic decoding the horizontal plane position, G-PCC encoder 200 may determine contexts for plane offset syntax elements and use the determined context to perform arithmetic decoding on the plane offset syntax elements. In different examples of this disclosure, G-PCC encoder 200 may determine the context for a plane offset syntax element from a plurality of contexts consisting of 2, 4, 8, 12, or 6 contexts, e.g., as described in the examples provided above.

FIG. 10 is a conceptual diagram illustrating an example range-finding system that may be used with one or more techniques of this disclosure. In the example of FIG. 10, G-PCC decoder 300 may determine that occupied child nodes of a node form a single plane perpendicular to a first axis of a coordinate system, wherein the first axis is a horizontal axis (1000). For example, G-PCC decoder 300 may determine based on a planar mode flag (e.g., is_planar_flag) whether the occupied child nodes of the node, G-PCC decoder 300 form a plane perpendicular to the first axis of the coordinate system. For instance, in this example, G-PCC decoder 300 may determine, based on the planar mode flag being equal to 1 that the occupied child nodes of the node form a plane perpendicular to the first axis of the coordinate system. Otherwise, if the planar mode flag is equal to 0, G-PCC decoder 300 may determine that the occupied child nodes of the node do not form a plane perpendicular to the first axis of the coordinate system. In some examples, based on determining that the occupied child nodes of the node form the plane perpendicular to the first axis, G-PCC decoder 300 may omit decoding of child nodes of the node that are not in the plane perpendicular to the first axis. Omitting decoding of the child nodes that are not in the plane perpendicular to the first axis may reduce the amount of data in geometry bitstream 203 and/or attribute bitstream 205.

G-PCC decoder 300 (e.g., geometry arithmetic decoding unit 302 of G-PCC decoder 300) may determine, from a plurality of contexts consisting of 8 contexts, a context for a horizontal plane position of the node (1002). The horizontal plane position indicates a position of the single plane that is perpendicular to the first axis of the coordinate system. For instance, G-PCC decoder 300 may determine the context using the processes described in the third example of reducing the number of contexts for coding the planar mode's horizontal plane position, as described above.

G-PCC decoder 300 (e.g., geometry arithmetic decoding unit 302 of G-PCC decoder 300) may perform arithmetic decoding on a syntax element indicating the horizontal plane position using the determined context (1004). For instance, G-PCC decoder 300 may perform arithmetic decoding on a plane_position syntax element. G-PCC decoder 300 may use the CABAC decoding as described above.

In some examples, in addition to or as an alternative to arithmetic decoding the horizontal plane position, G-PCC decoder 300 may determine contexts for horizontal axis plane offset syntax elements and use the determined context to perform arithmetic decoding on the horizontal axis plane offset syntax elements. In different examples of this disclosure, G-PCC decoder 300 may determine the context for a horizontal axis plane offset syntax element from a plurality of contexts consisting of 2, 4, 8, 12, or 6 contexts, e.g., as described in the examples provided above.

G-PCC decoder 300 may reconstruct the point cloud data. G-PCC decoder 300 use horizontal axis plane offset syntax elements as part of reconstructing the point cloud data. For instance, G-PCC decoder 300 may determine positions of points of the point cloud data based on the horizontal axis point offsets. For instance, G-PCC decoder 300 may determine an absolute position of a point in an x- or y-axis axis by adding a horizontal axis point offset to an x- or y-axis coordinate of an origin point of a node containing the point.

Figure 11:
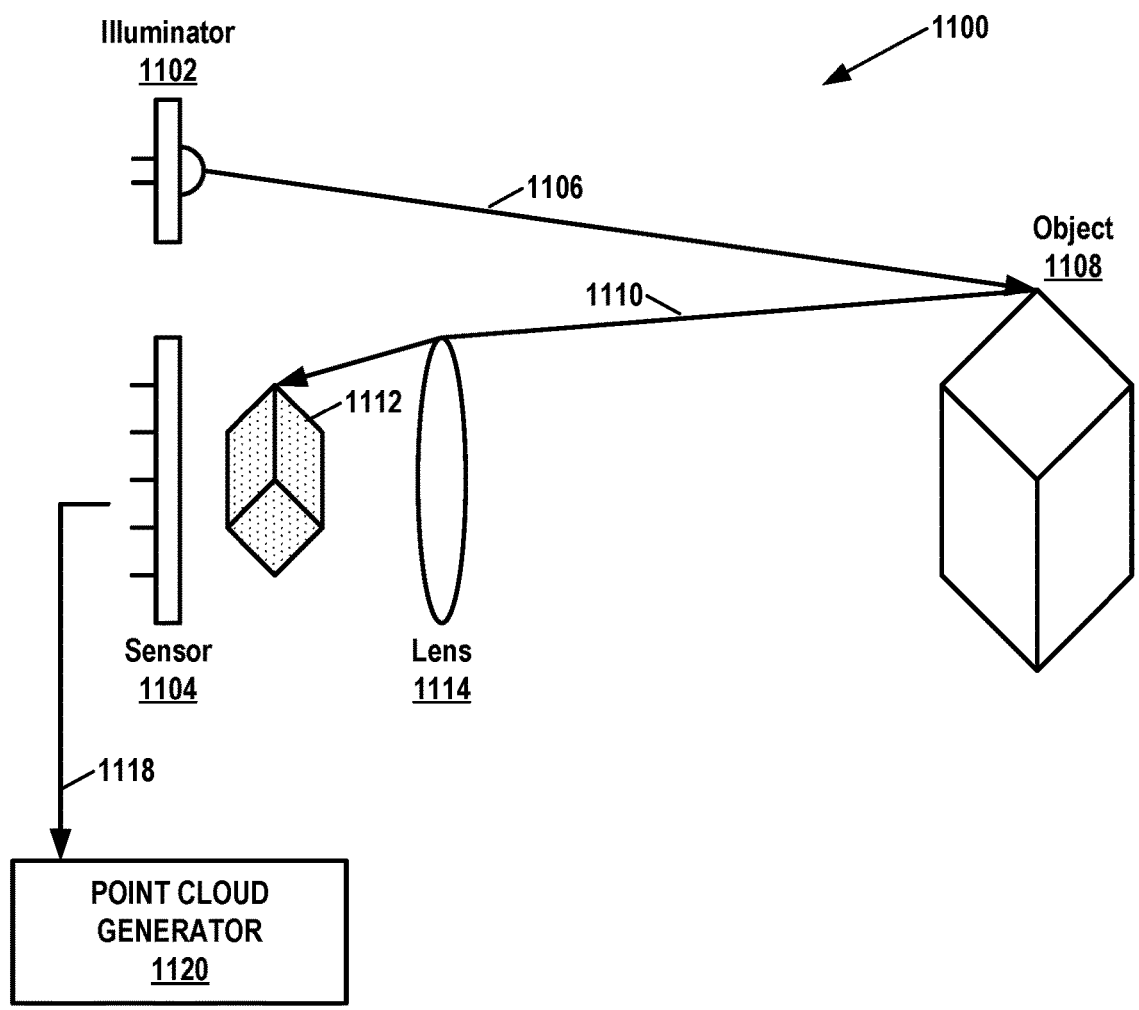
FIG. 11 is a conceptual diagram illustrating an example range-finding system that may be used with one or more techniques of this disclosure.

FIG. 11 is a conceptual diagram illustrating an example range-finding system 1100 that may be used with one or more techniques of this disclosure. In the example of FIG. 11, range-finding system 1100 includes an illuminator 1102 and a sensor 1104. Illuminator 1102 may emit light 1106. In some examples, illuminator 1102 may emit light 1106 as one or more laser beams. Light 1106 may be in one or more wavelengths, such as an infrared wavelength or a visible light wavelength. In other examples, light 1106 is not coherent laser light. When light 1106 encounters an object, such as object 1108, light 1106 creates returning light 1110. Returning light 1110 may include backscattered and/or reflected light. Returning light 1110 may pass through a lens 1111 that directs returning light 1110 to create an image 1112 of object 1108 on sensor 1104. Sensor 1104 generates signals 1414 based on image 1112. Image 1112 may comprise a set of points (e.g., as represented by dots in image 1112 of FIG. 11).

In some examples, illuminator 1102 and sensor 1104 may be mounted on a spinning structure so that illuminator 1102 and sensor 1104 capture a 360-degree view of an environment. In other examples, range-finding system 1100 may include one or more optical components (e.g., mirrors, collimators, diffraction gratings, etc.) that enable illuminator 1102 and sensor 1104 to detect ranges of objects within a specific range (e.g., up to 360-degrees). Although the example of FIG. 11 only shows a single illuminator 1102 and sensor 1104, range-finding system 1100 may include multiple sets of illuminators and sensors.

In some examples, illuminator 1102 generates a structured light pattern. In such examples, range-finding system 1100 may include multiple sensors 1104 upon which respective images of the structured light pattern are formed. Range-finding system 1100 may use disparities between the images of the structured light pattern to determine a distance to an object 1108 from which the structured light pattern backscatters. Structured light-based range-finding systems may have a high level of accuracy (e.g., accuracy in the sub-millimeter range), when object 1108 is relatively close to sensor 1104 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1100 is a time of flight (ToF)-based system. In some examples where range-finding system 1100 is a ToF-based system, illuminator 1102 generates pulses of light. In other words, illuminator 1102 may modulate the amplitude of emitted light 1106. In such examples, sensor 1104 detects returning light 1110 from the pulses of light 1106 generated by illuminator 1102. Range-finding system 1100 may then determine a distance to object 1108 from which light 1106 backscatters based on a delay between when light 1106 was emitted and detected and the known speed of light in air). In some examples, rather than (or in addition to) modulating the amplitude of the emitted light 1106, illuminator 1102 may modulate the phase of the emitted light 1106. In such examples, sensor 1104 may detect the phase of returning light 1110 from object 1108 and determine distances to points on object 1108 using the speed of light and based on time differences between when illuminator 1102 generated light 1106 at a specific phase and when sensor 1104 detected returning light 1110 at the specific phase.

In other examples, a point cloud may be generated without using illuminator 1102. For instance, in some examples, sensors 1104 of range-finding system 1100 may include two or more optical cameras. In such examples, range-finding system 1100 may use the optical cameras to capture stereo images of the environment, including object 1108. Range-finding system 1100 may include a point cloud generator 1420 that may calculate the disparities between locations in the stereo images. Range-finding system 1100 may then use the disparities to determine distances to the locations shown in the stereo images. From these distances, point cloud generator 1420 may generate point cloud data.

Sensors 1104 may also detect other attributes of object 1108, such as color and reflectance information. In the example of FIG. 11, a point cloud generator 1116 may generate point cloud data based on signals 1118 generated by sensor 1104. Range-finding system 1100 and/or point cloud generator 1116 may form part of data source 104 (FIG. 1). Hence, a point cloud generated by range-finding system 1100 may be encoded and/or decoded according to any of the techniques of this disclosure.

Figure 12:
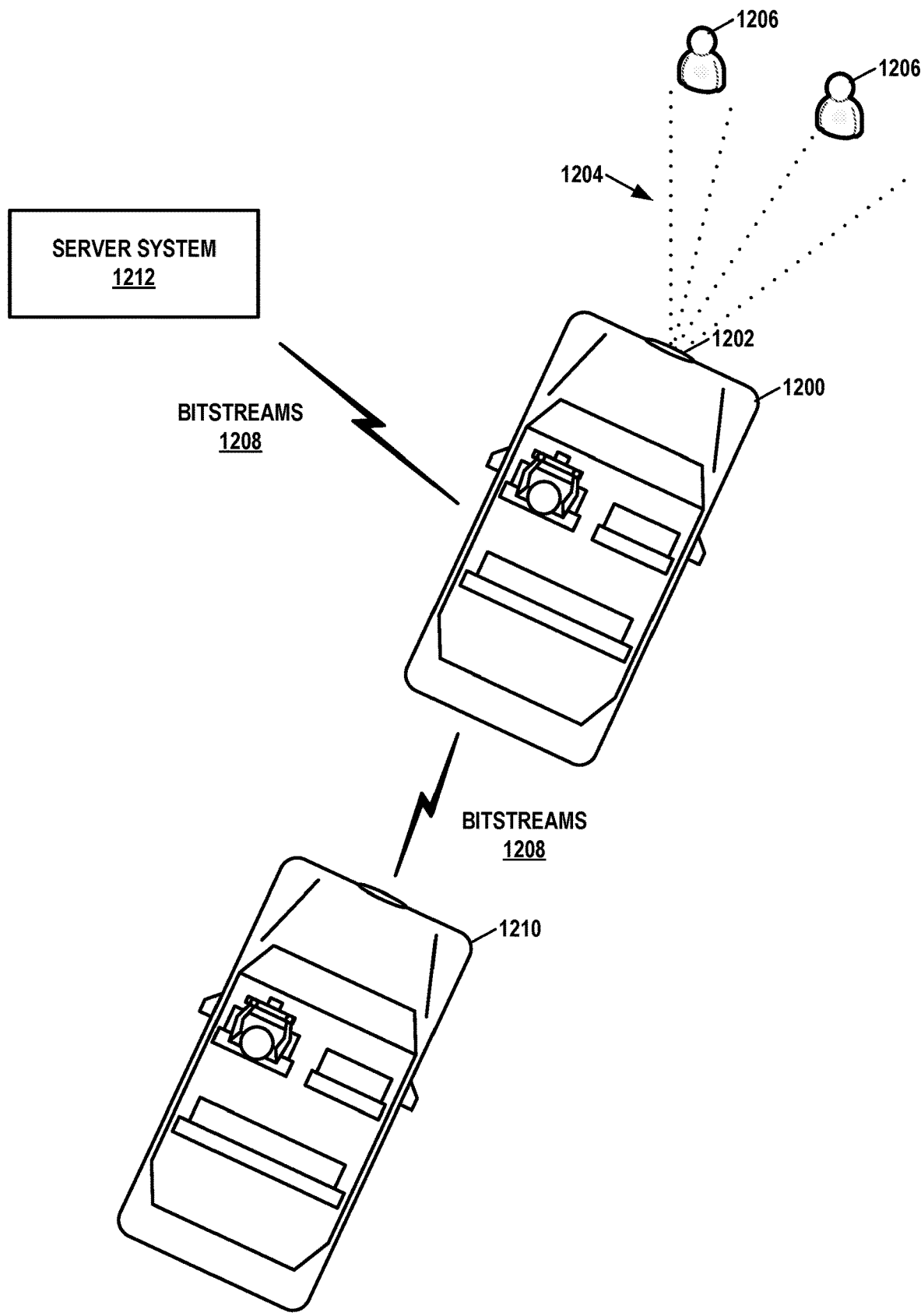
FIG. 12 is a conceptual diagram illustrating an example vehicle-based scenario in which one or more techniques of this disclosure may be used.

FIG. 12 is a conceptual diagram illustrating an example vehicle-based scenario in which one or more techniques of this disclosure may be used. In the example of FIG. 12, a vehicle 1200 includes a range-finding system 1202. Range-finding system 1202 may be implemented in the manner discussed with respect to FIG. 11. Although not shown in the example of FIG. 12, vehicle 1200 may also include a data source, such as data source 104 (FIG. 1), and a G-PCC encoder, such as G-PCC encoder 200 (FIG. 1). In the example of FIG. 15, range-finding system 1202 emits laser beams 1204 that reflect off pedestrians 1206 or other objects in a roadway. The data source of vehicle 1200 may generate point cloud data based on signals generated by range-finding system 1202. The G-PCC encoder of vehicle 1200 may encode the point cloud to generate bitstreams 1208, such as geometry bitstream 203 (FIG. 2) and attribute bitstream 205 (FIG. 2). Bitstreams 1208 may include many fewer bits than the unencoded point cloud obtained by the G-PCC encoder.

An output interface of vehicle 1200 (e.g., output interface 108 (FIG. 1) may transmit bitstreams 1208 to one or more other devices. Bitstreams 1208 may include many fewer bits than the unencoded point cloud obtained by the G-PCC encoder. Thus, vehicle 1200 may be able to transmit bitstreams 1208 to other devices more quickly than the unencoded point cloud data. Additionally, bitstreams 1208 may require less data storage capacity. The techniques of this disclosure may further reduce the number of bits in bitstreams 1208. For instance, determining a context index based on an intersection of a laser beam and a node, and using a context indicated by the context index for arithmetic coding of a vertical plane position or a vertical point position offset, may further reduce the number of bits in bitstreams 1208.

In the example of FIG. 12, vehicle 1200 may transmit bitstreams 1208 to another vehicle 1210. Vehicle 1210 may include a G-PCC decoder, such as G-PCC decoder 300 (FIG. 1). The G-PCC decoder of vehicle 1210 may decode bitstreams 1208 to reconstruct the point cloud data. Vehicle 1210 may use the reconstructed point cloud data for various purposes. For instance, vehicle 1210 may determine based on the reconstructed point cloud data that pedestrians 1206 are in the roadway ahead of vehicle 1200 and therefore start slowing down, e.g., even before a driver of vehicle 1210 realizes that pedestrians 1206 are in the roadway. Thus, in some examples, vehicle 1210 may perform an autonomous navigation operation based on the reconstructed point cloud data.

Additionally or alternatively, vehicle 1200 may transmit bitstreams 1208 to a server system 1212. Server system 1212 may use bitstreams 1208 for various purposes. For example, server system 1212 may store bitstreams 1208 for subsequent reconstruction of the point clouds. In this example, server system 1212 may use the point clouds along with other data (e.g., vehicle telemetry data generated by vehicle 1200) to train an autonomous driving system. In other example, server system 1212 may store bitstreams 1208 for subsequent reconstruction for forensic crash investigations (e.g., if vehicle 1200 collides with pedestrians 1206).

Because the techniques of this disclosure may reduce the complexity of selecting a context for the horizontal plane position and/or point offset, the techniques of this disclosure may accelerate the process of coding the point cloud. Moreover, the techniques of this disclosure may reduce the cost of hardware that may be used to implement encoders and decoders in vehicle 1200, vehicle 1210, and/or server system 1212.

Figure 13:
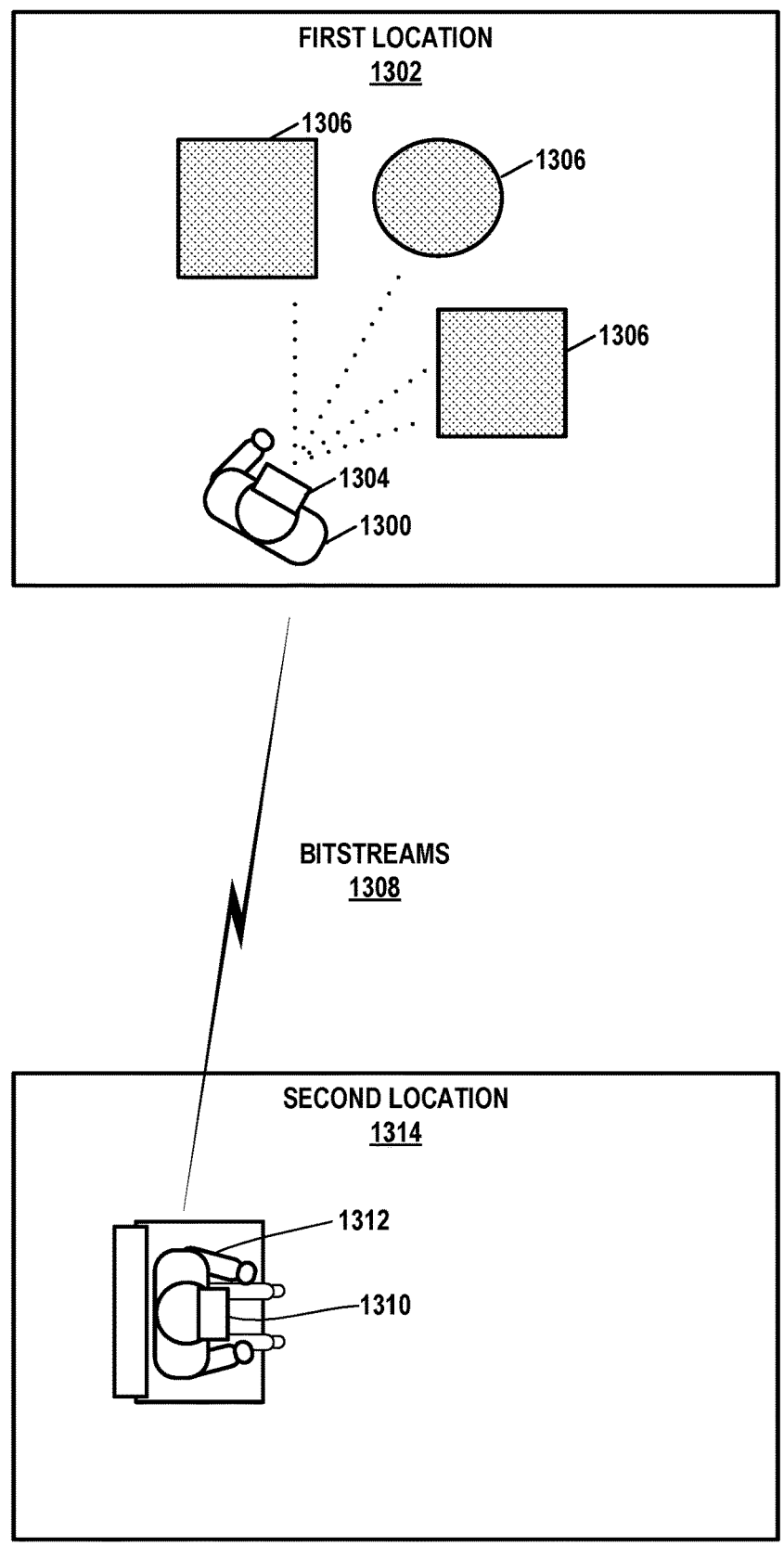
FIG. 13 is a conceptual diagram illustrating an example extended reality system in which one or more techniques of this disclosure may be used.

FIG. 13 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 13, a user 1300 is located in a first location 1302. User 1300 wears an XR headset 1304. As an alternative to XR headset 1304, user 1300 may use a mobile device (e.g., mobile phone, tablet computer, etc.). XR headset 1304 includes a depth detection sensor, such as a range-finding system, that detects positions of points on objects 1306 at location 1302. A data source of XR headset 1304 may use the signals generated by the depth detection sensor to generate point cloud data representation of objects 1306 at location 1302. XR headset 1304 may include a G-PCC encoder (e.g., G-PCC encoder 200 of FIG. 1) that is configured to encode the point cloud to generate bitstreams 1308.

XR headset 1304 may transmit bitstreams 1308 (e.g., via a network such as the Internet) to an XR headset 1310 worn by a user 1312 at a second location 1314. XR headset 1310 may decode bitstreams 1308 to reconstruct the point cloud. XR headset 1310 may use the point cloud to generate an XR visualization (e.g., an AR, MR, VR visualization) representing objects 1306 at location 1302. Thus, in some examples, such as when XR headset 1310 generates an VR visualization, user 1312 may have a 3D immersive experience of location 1302. In some examples, XR headset 1310 may determine a position of a virtual object based on the reconstructed point cloud data. For instance, XR headset 1310 may determine, based on the reconstructed point cloud data, that an environment (e.g., location 1302) includes a flat surface and then determine that a virtual object (e.g., a cartoon character) is to be positioned on the flat surface. XR headset 1310 may generate an XR visualization in which the virtual object is at the determined position. For instance, XR headset 1310 may show the cartoon character sitting on the flat surface.

Because the techniques of this disclosure may reduce the complexity of selecting a context for the horizontal plane position and/or point offset, the techniques of this disclosure may accelerate the process of coding the point cloud. Moreover, the techniques of this disclosure may reduce the cost of hardware that may be used to implement encoders and decoders in XR headset 1304 and/or XR headset 1310.

Figure 14:
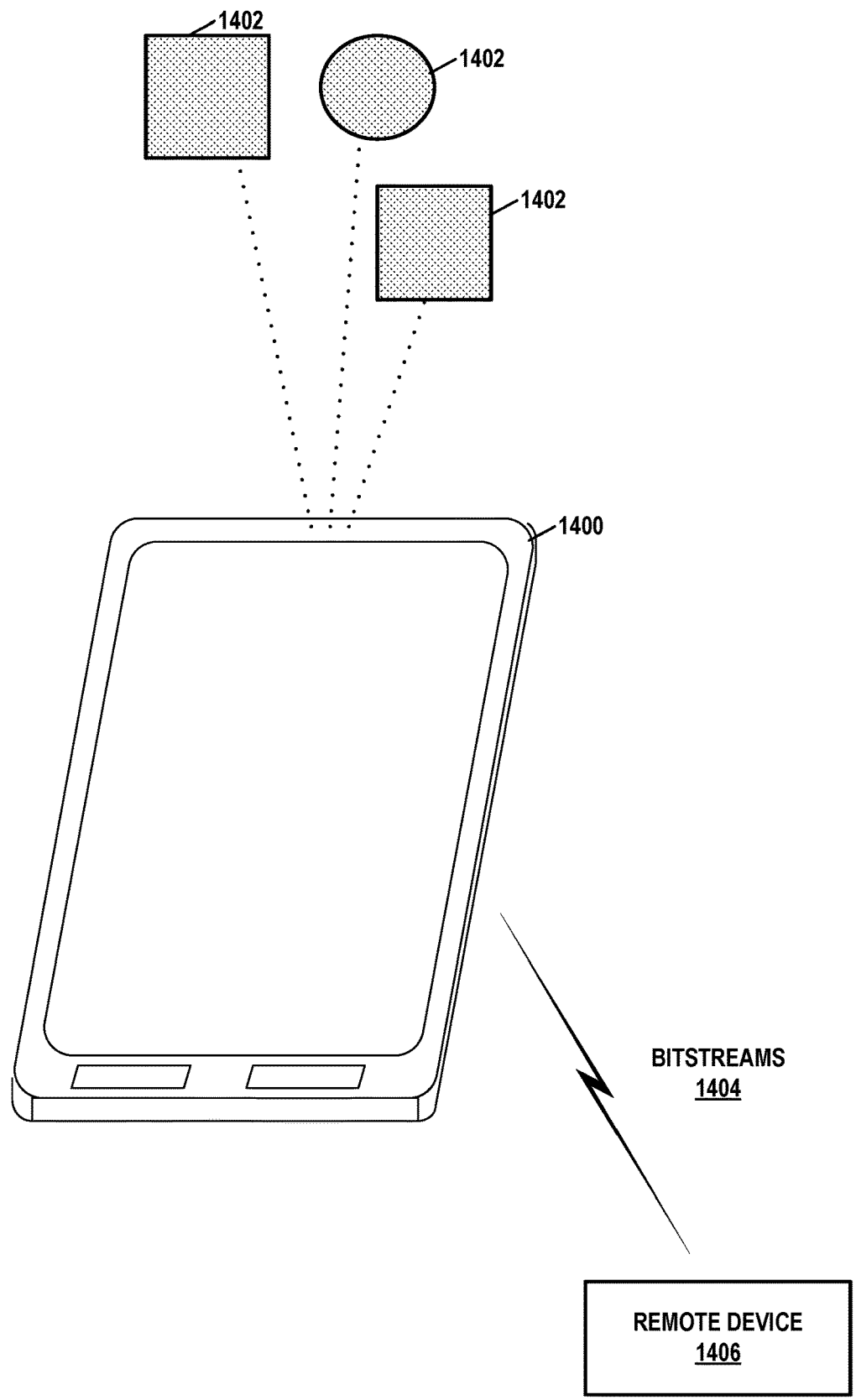
FIG. 14 is a conceptual diagram illustrating an example mobile device system in which one or more techniques of this disclosure may be used.

FIG. 14 is a conceptual diagram illustrating an example mobile device system in which one or more techniques of this disclosure may be used. In the example of FIG. 14, a mobile device 1400, such as a mobile phone or tablet computer, includes a range-finding system, such as a LIDAR system, that detects positions of points on objects 1402 in an environment of mobile device 1400. A data source of mobile device 1400 may use the signals generated by the depth detection sensor to generate point cloud data representing objects 1402. Mobile device 1400 may include a G-PCC encoder (e.g., G-PCC encoder 200 of FIG. 1) that is configured to encode the point cloud to generate bitstreams 1404. In the example of FIG. 14, mobile device 1400 may transmit bitstreams to a remote device 1406, such as a server system or other mobile device. Remote device 1406 may decode bitstreams 1404 to reconstruct the point cloud. Remote device 1406 may use the point cloud for various purposes. For example, remote device 1406 may use the point cloud to generate a map of environment of mobile device 1400. For instance, remote device 1406 may generate a map of an interior of a building based on the reconstructed point cloud data. In another example, remote device 1406 may generate imagery (e.g., computer graphics) based on the reconstructed point cloud data. For instance, remote device 1406 may use points of the point cloud as vertices of polygons and use color attributes of the points as the basis for shading the polygons. In some examples, remote device 1406 may use the reconstructed point cloud data for facial recognition or other security applications.

Because the techniques of this disclosure may reduce the complexity of selecting a context for the horizontal plane position and/or point offset, the techniques of this disclosure may accelerate the process of coding the point cloud. Moreover, the techniques of this disclosure may reduce the cost of hardware that may be used to implement encoders and decoders in mobile device 1400 and/or remote device 1406.

The techniques of this disclosure may further reduce the number of bits in bitstreams 1404. For instance, determining a context index based on an intersection of a laser beam and a node, and using a context indicated by the context index for arithmetic coding of a vertical plane position or a vertical point position offset, may further reduce the number of bits in bitstreams 1404.

Examples in the various aspects of this disclosure may be used individually or in any combination. The following is a non-limiting list of aspects that may be in accordance with one or more techniques of this disclosure.

Aspect 1A: A method of coding point cloud data includes determining a context for a planar mode horizontal plane position from a plurality of contexts, wherein the plurality of contexts consists of 2, 4, 6, 8, or 12 contexts; entropy coding the planar mode horizontal plane position using the determined context; and coding at least one point in a point cloud based on the planar mode horizontal plane position.

Aspect 2A: A method of coding point cloud data includes determining a context for a syntax element for an axis from a set of contexts, wherein the syntax element indicates whether a current child node is planar in a direction perpendicular to the axis; entropy coding the syntax element using the determined context; and coding at least one point in a point cloud based on the planar mode horizontal plane position.

Aspect 3A: The method of aspect 2A, wherein the set of contexts consists of 1 context per axis.

Aspect 4A: A method of coding point cloud data includes determining a context for a syntax element for an axis from a set of contexts, wherein the syntax element indicates whether a position of a plan for a planar mode is at a higher or lower position relative to a plane corresponding to the axis; entropy coding the syntax element using the determined context; and coding at least one point in a point cloud based on the planar mode horizontal plane position.

Aspect 5A: The method of aspect 4A, wherein the set of contexts consists of 1 context per axis.

Aspect 6A: A method of coding point cloud data includes determining a context for a syntax element for an axis from a set of contexts, wherein the syntax element indicates whether a current child node is planar in a direction perpendicular to the axis and determining the context comprises determining an context index for the context as being equal to an axis index of the axis; entropy coding the syntax element using the determined context; and coding at least one point in a point cloud based on the planar mode horizontal plane position.

Aspect 7A: The method of any of aspects 1A-6A, further comprising generating the point cloud.

Aspect 8A: A device for processing a point cloud, the device comprising one or more means for performing the method of any of aspects 1A-7A.

Aspect 9A: The device of aspect 8A, wherein the one or more means comprise one or more processors implemented in circuitry.

Aspect 10A: The device of any of aspects 8A or 9A, further comprising a memory to store the data representing the point cloud.

Aspect 11A: The device of any of aspects 8A-10A, wherein the device comprises a decoder.

Aspect 12A: The device of any of aspects 8A-11A, wherein the device comprises an encoder.

Aspect 13A: The device of any of aspects 8A-12A, further comprising a device to generate the point cloud.

Aspect 14A: The device of any of aspects 8A-13A, further comprising a display to present imagery based on the point cloud.

Aspect 15A: A computer-readable storage medium having stored thereon instructions that, when executed, cause one or more processors to perform the method of any of aspects 1A-7A.

Aspect 1B: A device for encoding point cloud data includes a memory to store the point cloud data; and one or more processors coupled to the memory and implemented in circuitry, the one or more processors configured to: determine that occupied child nodes of a node form a single plane perpendicular to a first axis of a coordinate system, wherein the first axis is a horizontal axis and the occupied child nodes contain points represented by the point cloud data; determine a horizontal plane position of the node, wherein the horizontal plane position indicates a position of the single plane that is perpendicular to the first axis of the coordinate system; determine, from a plurality of contexts consisting of 8 contexts, a context for the horizontal plane position of the node; and perform arithmetic encoding on a syntax element indicating the horizontal plane position using the determined context.

Aspect 2B: The device of aspect 1B, wherein the one or more processors are configured to, as part of determining the context for the horizontal plane position of the node: determine a first-axis position as a difference between a first-axis coordinate of an origin point of the node and a first-axis coordinate of an origin point of the coordinate system; determine a second-axis position as a difference between a second-axis coordinate of the origin point of the node and a second-axis coordinate of the origin point of the coordinate system; determine a first angle as a difference between a node origin angle and a laser angle, wherein: the node origin angle is an angle, relative to the first axis of the coordinate system, of a line passing from the origin point of the coordinate system through an origin point of the node, and the laser angle is an angle, relative to the first axis, of an applicable laser originating at the origin point of the coordinate system, wherein the applicable laser is a closest laser to the node; determine a second angle as a difference between a node center angle and the laser angle, wherein the node center angle is an angle, relative to the first axis of the coordinate system, of a line passing from the origin point of the coordinate system through a center point of the node; set an azimuth angle context value to either 2 or 0 depending on whether both the first angle and the second angle are non-negative or both the first angle and the second angle are negative; set the first angle to an absolute value of the first angle; set the second angle to an absolute value of the second angle; based on the first angle being greater than the second angle: increment the azimuth angle context value by 1; set a temporary value to the first angle; set the first angle to the second angle; and set the second angle to the temporary value; based on the second angle being greater than a shifted value, increment the azimuth angle context value by 4, wherein the shifted value is equal to the first angle left shifted by 2; based on an absolute value of the first-axis position being less than or equal to an absolute value of the second-axis position, set a first-axis azimuth angle context value to the context angle value; based on the absolute value of the first-axis position being greater than the absolute value of the second-axis position, set a second-axis azimuth angle context value to the context angle value; and determine the context based on the first-axis azimuth angle context value or the second-axis azimuth context value.

Aspect 3B: The device of any of aspects 1B and 2B, wherein the one or more processors are configured to, based on determining that the occupied child nodes of the node form the plane perpendicular to the first axis, omit encoding of child nodes of the node that are not in the plane perpendicular to the first axis.

Aspect 4B: The device of any of aspects 1B through 3B, wherein the context is a first context, the plurality of contexts is a first plurality of contexts, and the one or more processors are further configured to: determine a first angle as a difference between a node origin angle and a laser angle, wherein: the node origin angle is an angle, relative to the first axis of the coordinate system, of a line passing from an origin point of the coordinate system through an origin point of the node, and the laser angle is an angle, relative to the first axis, of an applicable laser originating at the origin point of the coordinate system, wherein the applicable laser is a closest laser to the node; determine a second angle as a difference between a node center angle and the laser angle, wherein the node center angle is an angle, relative to the first axis of the coordinate system, of a line passing from the origin point of the coordinate system through a center point of the node; set a context value to either 2 or 0 depending on whether both the first angle and the second angle are non-negative or both the first angle and the second angle are negative; set the first angle to an absolute value of the first angle; set the second angle to an absolute value of the second angle; based on the first angle being greater than the second angle: increment the azimuth angle context value by 1; set a temporary value to the first angle; set the first angle to the second angle; and set the second angle to the temporary value; based on the second angle being greater than a shifted value, increment the azimuth angle context value by 4, wherein the shifted value is equal to the first angle left shifted by 1; determine, from a second plurality of contexts, a second context based on the azimuth angle context value, wherein the second plurality of contexts consists of 8 contexts; and perform arithmetic encoding on one or more bits of a point offset using the determined context, wherein the point offset is a first-axis coordinate of a point of the node relative to the origin point of the node.

Aspect 5B: The device of any of aspects 1B through 4B, wherein the node is a first node, the context is a first context, the plurality of contexts is a first plurality of contexts, the single plane is a first single plane, an angular planar coding mode and an azimuthal planar coding mode are disabled for a second node, and the one or more processors are further configured to: determine a context index that is equal to an axis index of the first axis regardless of occupancy of a neighbor node or Manhattan distance between a position of the node and a position of a most-recently node with a same axis position value for the first axis and regardless of whether tracking of closest nodes using a buffer is used in a process of coding a planar mode flag and plane position, wherein the axis position value for the first axis indicates 14 least significant bits of a first-axis coordinate of the node; and perform arithmetic encoding on a planar flag for the first axis using a context indicated by the context index, wherein the planar flag indicates that child nodes of the second node form a second single plane perpendicular to the first axis of the coordinate system, and the context indicated by the context index is in a second plurality of contexts different from the first plurality of contexts.

Aspect 6B: The device of any of aspects 1B through 5B, wherein the one or more processors are further configured to generate the point cloud data.

Aspect 7B: The device of aspect 6B, wherein the one or more processors are configured to, as part of generating the point cloud data, generate the point cloud data based on signals from a LIDAR apparatus.

Aspect 8B: The device of any of aspects 1B through 7B, wherein the device is one of a mobile phone, tablet computer, a vehicle, or an extended reality device.

Aspect 9B: The device of any of aspects 1B through 8B, wherein the device comprises an interface configured to transmit encoded point cloud data.

Aspect 10B: A device for decoding point cloud data includes a memory to store the point cloud data; and one or more processors coupled to the memory and implemented in circuitry, the one or more processors configured to: determine that occupied child nodes of a node form a single plane perpendicular to a first axis of a coordinate system, wherein the first axis is a horizontal axis and the occupied child nodes contain points represented by the point cloud data; determine, from a plurality of contexts consisting of 8 contexts, a context for a horizontal plane position of the node, wherein the horizontal plane position indicates a position of the single plane that is perpendicular to the first axis of the coordinate system; and perform arithmetic decoding on a syntax element indicating the horizontal plane position using the determined context.

Aspect 11B: The device of aspect 10B, wherein the one or more processors are configured to, as part of determining the context for the horizontal plane position of the node: determine a first-axis position as a difference between a first-axis coordinate of an origin point of the node and a first-axis coordinate of an origin point of the coordinate system; determine a second-axis position as a difference between a second-axis coordinate of the origin point of the node and a second-axis coordinate of the origin point of the coordinate system; determine a first angle as a difference between a node origin angle and a laser angle, wherein: the node origin angle is an angle, relative to the first axis of the coordinate system, of a line passing from the origin point of the coordinate system through an origin point of the node, and the laser angle is an angle, relative to the first axis, of an applicable laser originating at the origin point of the coordinate system, wherein the applicable laser is a closest laser to the node; determine a second angle as a difference between a node center angle and the laser angle, wherein the node center angle is an angle, relative to the first axis of the coordinate system, of a line passing from the origin point of the coordinate system through a center point of the node; set an azimuth angle context value to either 2 or 0 depending on whether both the first angle and the second angle are non-negative or both the first angle and the second angle are negative; set the first angle to an absolute value of the first angle; set the second angle to an absolute value of the second angle; based on the first angle being greater than the second angle: increment the azimuth angle context value by 1; set a temporary value to the first angle; set the first angle to the second angle; and set the second angle to the temporary value; based on the second angle being greater than a shifted value, increment the azimuth angle context value by 4, wherein the shifted value is equal to the first angle left shifted by 2; based on an absolute value of the first-axis position being less than or equal to an absolute value of the second-axis position, set a first-axis azimuth angle context value to the context angle value; based on the absolute value of the first-axis position being greater than the absolute value of the second-axis position, set a second-axis azimuth angle context value to the context angle value; determine the context based on the first-axis azimuth angle context value or the second-axis azimuth context value.

Aspect 12B: The device of any of aspects 10B and 11B, wherein the one or more processors are configured to, based on determining that occupied child nodes of the node form the plane perpendicular to the first axis, omit decoding of child nodes of the node that are not in the plane perpendicular to the first axis.

Aspect 13B: The device of any of aspects 10B through 12B, wherein the context is a first context, the plurality of contexts is a first plurality of contexts, and the one or more processors are further configured to: determine a first angle as a difference between a node origin angle and a laser angle, wherein: the node origin angle is an angle, relative to the first axis of the coordinate system, of a line passing from an origin point of the coordinate system through an origin point of the node, and the laser angle is an angle, relative to the first axis, of an applicable laser originating at the origin point of the coordinate system, wherein the applicable laser is a closest laser to the node; determine a second angle as a difference between a node center angle and the laser angle, wherein the node center angle is an angle, relative to the first axis of the coordinate system, of a line passing from the origin point of the coordinate system through a center point of the node; set an azimuth angle context value to either 2 or 0 depending on whether both the first angle and the second angle are non-negative or both the first angle and the second angle are negative; set the first angle to an absolute value of the first angle; set the second angle to an absolute value of the second angle; based on the first angle being greater than the second angle: increment the azimuth angle context value by 1; set a temporary value to the first angle; set the first angle to the second angle; and set the second angle to the temporary value; based on the second angle being greater than a shifted value, increment the azimuth angle context value by 4, wherein the shifted value is equal to the first angle left shifted by 1; determine, from a second plurality of contexts, a second context based on the azimuth angle context value, wherein the second plurality of contexts consists of 8 contexts; and perform arithmetic decoding on one or more bits of a horizontal axis point offset using the determined context, wherein the point offset is a first-axis coordinate of a point of the node relative to the origin point of the node.

Aspect 14B: The device of aspect 13B, wherein the one or more processors are further configured to reconstruct the point cloud data, and wherein the one or more processors are configured to, as part of reconstructing the point cloud data, determine a position of the point of the node based on the horizontal axis point offset.

Aspect 15B: The device of any of aspects 10B through 14B, wherein the node is a first node, the context is a first context, the plurality of contexts is a first plurality of contexts, the single plane is a first single plane, an angular planar coding mode and an azimuthal planar coding mode are disabled for a second node, and the one or more processors are further configured to: determine a context index that is equal to an axis index of the first axis regardless of occupancy of a neighbor node or Manhattan distance between a position of the node and a position of a most-recently node with a same axis position value for the first axis and regardless of whether tracking of closest nodes using a buffer is used in a process of coding a planar mode flag and plane position, the axis position value for the first axis indicates 14 least significant bits of a first-axis coordinate of the node; and perform arithmetic decoding on a planar flag for the first axis using a context indicated by the context index, wherein the planar flag indicates that child nodes of the second node form a second single plane perpendicular to the first axis of the coordinate system, and the context indicated by the context index is in a second plurality of contexts different from the first plurality of contexts.

Aspect 16B: The device of any of aspects 10B through 15B,
wherein the one or more processors are further configured to reconstruct the point cloud data; and perform one or more of: generate a map of an interior of a building based on the reconstructed point cloud data, perform an autonomous navigation operation based on the reconstructed point cloud data, or generate computer graphics based on the reconstructed point cloud data.

Aspect 17B: The device of any of aspects 10B through 16B, wherein the one or more processors are configured to: determine a position of a virtual object based on the reconstructed point cloud data; and generate an extended reality (XR) visualization in which the virtual object is at the determined position.

Aspect 18B: The device of any of aspects 10B through 17B, wherein the device is one of a mobile phone, a tablet computer, a vehicle, or an extended reality device.

Aspect 19B: The device of any of aspects 10B through 18B, further comprising a display to present imagery based on the point cloud data.

Aspect 20B: A method for encoding point cloud data includes determining that occupied child nodes of a node form a single plane perpendicular to a first axis of a coordinate system, wherein the first axis is a horizontal axis and the occupied child nodes contain points represented by the point cloud data; determining a horizontal plane position of the node, wherein the horizontal plane position indicates a position of the single plane that is perpendicular to the first axis of the coordinate system; determining, from a plurality of contexts consisting of 8 contexts, a context for the horizontal plane position of the node; and performing arithmetic encoding on a syntax element indicating the horizontal plane position using the determined context.

Aspect 21B: The method of aspect 20B, wherein determining the context for the horizontal plane position of the node comprises: determining a first-axis position as a difference between a first-axis coordinate of an origin point of the node and a first-axis coordinate of an origin point of the coordinate system; determining a second-axis position as a difference between a second-axis coordinate of the origin point of the node and a second-axis coordinate of the origin point of the coordinate system; determining a first angle as a difference between a node origin angle and a laser angle, wherein: the node origin angle is an angle, relative to the first axis of the coordinate system, of a line passing from the origin point of the coordinate system through the origin point of the node, and the laser angle is an angle, relative to the first axis, of an applicable laser originating at the origin point of the coordinate system, wherein the applicable laser is a closest laser to the node; determining a second angle as a difference between a node center angle and the laser angle, wherein the node center angle is an angle, relative to the first axis of the coordinate system, of a line passing from the origin point of the coordinate system through a center point of the node; setting an azimuth angle context value to either 2 or 0 depending on whether both the first angle and the second angle are non-negative or both the first angle and the second angle are negative; setting the first angle to an absolute value of the first angle; setting the second angle to an absolute value of the second angle; based on the first angle being greater than the second angle: incrementing the azimuth angle context value by 1; setting a temporary value to the first angle; setting the first angle to the second angle; and setting the second angle to the temporary value; based on the second angle being greater than a shifted value, increment the azimuth angle context value by 4, wherein the shifted value is equal to the first angle left shifted by 2; based on an absolute value of the first-axis position being less than or equal to an absolute value of the second-axis position, setting a first-axis azimuth angle context value to the context angle value; based on the absolute value of the first-axis position being greater than the absolute value of the second-axis position, setting a second-axis azimuth angle context value to the context angle value; and determining the context based on the first-axis azimuth angle context value or the second-axis azimuth context value.

Aspect 22B: The method of any of aspects 20B and 21B, wherein the context is a first context, the plurality of contexts is a first plurality of contexts, and the method further comprises: determining a first angle as a difference between a node origin angle and a laser angle, wherein: the node origin angle is an angle, relative to the first axis of the coordinate system, of a line passing from an origin point of the coordinate system through an origin point of the node, and the laser angle is an angle, relative to the first axis, of an applicable laser originating at the origin point of the coordinate system, wherein the applicable laser is a closest laser to the node; determining a second angle as a difference between a node center angle and the laser angle, wherein the node center angle is an angle, relative to the first axis of the coordinate system, of a line passing from the origin point of the coordinate system through a center point of the node; setting a context value to either 2 or 0 depending on whether both the first angle and the second angle are non-negative or both the first angle and the second angle are negative; setting the first angle to an absolute value of the first angle; setting the second angle to an absolute value of the second angle; based on the first angle being greater than the second angle: incrementing the azimuth angle context value by 1; setting a temporary value to the first angle; setting the first angle to the second angle; and setting the second angle to the temporary value; based on the second angle being greater than a shifted value, incrementing the azimuth angle context value by 4, wherein the shifted value is equal to the first angle left shifted by 1; determining, from a second plurality of contexts, a second context based on the azimuth angle context value, wherein the second plurality of contexts consists of 8 contexts; and performing arithmetic encoding on one or more bits of a point offset using the determined context, wherein the point offset is a first-axis coordinate of a point of the node relative to the origin point of the node.

Aspect 23B: The method of any of aspects 20B through 22B, wherein the node is a first node, the context is a first context, the plurality of contexts is a first plurality of contexts, the single plane is a first single plane, an angular planar coding mode and an azimuthal planar coding mode are disabled for a second node, and the method further comprises: determining a context index that is equal to an axis index of the first axis regardless of occupancy of a neighbor node or Manhattan distance between a position of the node and a position of a most-recently node with a same axis position value for the first axis and regardless of whether tracking of closest nodes using a buffer is used in a process of coding a planar mode flag and plane position, wherein the axis position value for the first axis indicates 14 least significant bits of a first-axis coordinate of the node; and performing arithmetic encoding on a planar flag for the first axis using a context indicated by the context index, wherein the planar flag indicates that child nodes of the second node form a second single plane perpendicular to the first axis of the coordinate system, and the context indicated by the context index is in a second plurality of contexts different from the first plurality of contexts.

Aspect 24B: A method for decoding point cloud data includes determining that occupied child nodes of a node form a single plane perpendicular to a first axis of a coordinate system, wherein the first axis is a horizontal axis and the occupied child nodes contain points represented by the point cloud data; determining, from a plurality of contexts consisting of 8 contexts, a context for a horizontal plane position of the node, wherein the horizontal plane position indicates a position of the single plane that is perpendicular to the first axis of the coordinate system; and performing arithmetic decoding on a syntax element indicating the horizontal plane position using the determined context.

Aspect 25B: The method of aspect 24B, wherein determining the context for the horizontal plane position of the node comprises: determining a first-axis position as a difference between a first-axis coordinate of an origin point of the node and a first-axis coordinate of an origin point of the coordinate system; determining a second-axis position as a difference between a second-axis coordinate of the origin point of the node and a second-axis coordinate of the origin point of the coordinate system; determining a first angle as a difference between a node origin angle and a laser angle, wherein: the node origin angle is an angle, relative to the first axis of the coordinate system, of a line passing from the origin point of the coordinate system through the origin point of the node, and the laser angle is an angle, relative to the first axis, of an applicable laser originating at the origin point of the coordinate system, wherein the applicable laser is a closest laser to the node; determining a second angle as a difference between a node center angle and the laser angle, wherein the node center angle is an angle, relative to the first axis of the coordinate system, of a line passing from the origin point of the coordinate system through a center point of the node; setting an azimuth angle context value to either 2 or 0 depending on whether both the first angle and the second angle are non-negative or both the first angle and the second angle are negative; setting the first angle to an absolute value of the first angle; setting the second angle to an absolute value of the second angle; based on the first angle being greater than the second angle: incrementing the azimuth angle context value by 1; setting a temporary value to the first angle; setting the first angle to the second angle; and setting the second angle to the temporary value; based on the second angle being greater than a shifted value, incrementing the azimuth angle context value by 4, wherein the shifted value is equal to the first angle left shifted by 2;

based on an absolute value of the first-axis position being less than or equal to an absolute value of the second-axis position, setting a first-axis azimuth angle context value to the context angle value; based on the absolute value of the first-axis position being greater than the absolute value of the second-axis position, setting a second-axis azimuth angle context value to the context angle value; determining the context based on the first-axis azimuth angle context value or the second-axis azimuth context value.

Aspect 26B: The method of any of aspects 24B and 25B, further comprising, based on determining that the occupied child nodes of the node form the plane perpendicular to the first axis, omitting decoding of child nodes of the node that are not in the plane perpendicular to the first axis.

Aspect 27B: The method of any of aspects 24B through 26B, wherein the context is a first context, the plurality of contexts is a first plurality of contexts, and method further comprises: determining a first angle as a difference between a node origin angle and a laser angle, wherein: the node origin angle is an angle, relative to the first axis of the coordinate system, of a line passing from an origin point of the coordinate system through an origin point of the node, and the laser angle is an angle, relative to the first axis, of an applicable laser originating at the origin point of the coordinate system, wherein the applicable laser is a closest laser to the node; determining a second angle as a difference between a node center angle and the laser angle, wherein the node center angle is an angle, relative to the first axis of the coordinate system, of a line passing from the origin point of the coordinate system through a center point of the node; setting an azimuth angle context value to either 2 or 0 depending on whether both the first angle and the second angle are non-negative or both the first angle and the second angle are negative; setting the first angle to an absolute value of the first angle; setting the second angle to an absolute value of the second angle; based on the first angle being greater than the second angle: incrementing the azimuth angle context value by 1; setting a temporary value to the first angle; setting the first angle to the second angle; and setting the second angle to the temporary value; based on the second angle being greater than a shifted value, incrementing the azimuth angle context value by 4, wherein the shifted value is equal to the first angle left shifted by 1; determining, from a second plurality of contexts, a second context based on the azimuth angle context value, wherein the second plurality of contexts consists of 8 contexts; and performing arithmetic decoding on one or more bits of a horizontal axis point offset using the determined context, wherein the point offset is a first-axis coordinate of a point of the node relative to the origin point of the node.

Aspect 28B: The method of aspect 27B, further comprising reconstructing the point cloud data, wherein reconstructing the point cloud data comprises determining a position of the point of the node based on the horizontal axis point offset.

Aspect 29B: The method of any of aspects 24B through 28B, wherein the node is a first node, the context is a first context, the plurality of contexts is a first plurality of contexts, the single plane is a first single plane, an angular planar coding mode and an azimuthal planar coding mode are disabled for a second node, and the method further comprises: determining a context index that is equal to an axis index of the first axis regardless of occupancy of a neighbor node or Manhattan distance between a position of the node and a position of a most-recently node with a same axis position value for the first axis and regardless of whether tracking of closest nodes using a buffer is used in a process of coding a planar mode flag and plane position, the axis position value for the first axis indicates 14 least significant bits of a first-axis coordinate of the node; and performing arithmetic decoding on a planar flag for the first axis using a context indicated by the context index, wherein the planar flag indicates that child nodes of the second node form a second single plane perpendicular to the first axis of the coordinate system, and the context indicated by the context index is in a second plurality of contexts different from the first plurality of contexts.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. Processors may be coupled to memory for retrieval and storage of data.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for encoding point cloud data, the device comprising:
   a memory to store the point cloud data; and
   one or more processors coupled to the memory and implemented in circuitry, the one or more processors configured to:
   determine that occupied child nodes of a node form a single plane perpendicular to a first axis of a coordinate system, wherein the first axis is a horizontal axis and the occupied child nodes contain points represented by the point cloud data;
   determine a horizontal plane position of the node, wherein the horizontal plane position indicates a position of the single plane that is perpendicular to the first axis of the coordinate system;
   determine, from a plurality of contexts consisting of 8 contexts, a context for the horizontal plane position of the node; and
   perform arithmetic encoding on a syntax element indicating the horizontal plane position using the determined context.

2. The device of claim 1, wherein the one or more processors are configured to, based on determining that the occupied child nodes of the node form the plane perpendicular to the first axis, omit encoding of child nodes of the node that are not in the plane perpendicular to the first axis.

3. The device of claim 1, wherein the node is a first node, the context is a first context, the plurality of contexts is a first plurality of contexts, the single plane is a first single plane, an angular planar coding mode and an azimuthal planar coding mode are disabled for a second node, and the one or more processors are further configured to:
   determine a context index that is equal to an axis index of the first axis regardless of occupancy of a neighbor node or Manhattan distance between a position of the node and a position of a most-recently node with a same axis position value for the first axis and regardless of whether tracking of closest nodes using a buffer is used in a process of coding a planar mode flag and plane position, wherein the axis position value for the first axis indicates 14 least significant bits of a first-axis coordinate of the node; and
   perform arithmetic encoding on a planar flag for the first axis using a context indicated by the context index, wherein the planar flag indicates that child nodes of the second node form a second single plane perpendicular to the first axis of the coordinate system, and the context indicated by the context index is in a second plurality of contexts different from the first plurality of contexts.

4. The device of claim 1, wherein the one or more processors are further configured to generate the point cloud data.

5. The device of claim 4, wherein the one or more processors are configured to, as part of generating the point cloud data, generate the point cloud data based on signals from a LIDAR apparatus.

6. The device of claim 1, wherein the device is one of a mobile phone, tablet computer, a vehicle, or an extended reality device.

7. The device of claim 1, wherein the device comprises an interface configured to transmit encoded point cloud data.

8. A device for decoding point cloud data, the device comprising:
   a memory to store the point cloud data; and
   one or more processors coupled to the memory and implemented in circuitry, the one or more processors configured to:
   determine that occupied child nodes of a node form a single plane perpendicular to a first axis of a coordinate system, wherein the first axis is a horizontal axis and the occupied child nodes contain points represented by the point cloud data;
   determine, from a plurality of contexts consisting of 8 contexts, a context for a horizontal plane position of the node, wherein the horizontal plane position indicates a position of the single plane that is perpendicular to the first axis of the coordinate system; and
   perform arithmetic decoding on a syntax element indicating the horizontal plane position using the determined context.

9. The device of claim 8, wherein the one or more processors are configured to, based on determining that the occupied child nodes of the node form the plane perpendicular to the first axis, omit decoding of child nodes of the node that are not in the plane perpendicular to the first axis.

10. The device of claim 8, wherein the one or more processors are further configured to reconstruct the point cloud data, and wherein the one or more processors are configured to, as part of reconstructing the point cloud data, determine a position of the point of the node based on the horizontal axis point offset.

11. The device of claim 8, wherein the node is a first node, the context is a first context, the plurality of contexts is a first plurality of contexts, the single plane is a first single plane, an angular planar coding mode and an azimuthal planar coding mode are disabled for a second node, and the one or more processors are further configured to:
   determine a context index that is equal to an axis index of the first axis regardless of occupancy of a neighbor node or Manhattan distance between a position of the node and a position of a most-recently node with a same axis position value for the first axis and regardless of whether tracking of closest nodes using a buffer is used in a process of coding a planar mode flag and plane position, the axis position value for the first axis indicates 14 least significant bits of a first-axis coordinate of the node; and perform arithmetic decoding on a planar flag for the first axis using a context indicated by the context index, wherein the planar flag indicates that child nodes of the second node form a second single plane perpendicular to the first axis of the coordinate system, and the context indicated by the context index is in a second plurality of contexts different from the first plurality of contexts.

12. The device of claim 8, wherein the one or more processors are further configured to:
reconstruct the point cloud data; and
perform one or more of:
generate a map of an interior of a building based on the reconstructed point cloud data,
perform an autonomous navigation operation based on the reconstructed point cloud data, or
generate computer graphics based on the reconstructed point cloud data.

13. The device of claim 8, wherein the one or more processors are configured to:
reconstruct the point cloud data;
determine a position of a virtual object based on the reconstructed point cloud data; and
generate an extended reality (XR) visualization in which the virtual object is at the determined position.

14. The device of claim 8, wherein the device is one of a mobile phone, a tablet computer, a vehicle, or an extended reality device.

15. The device of claim 8, further comprising a display to present imagery based on the point cloud data.

16. A method for encoding point cloud data, the method comprising:
determining that occupied child nodes of a node form a single plane perpendicular to a first axis of a coordinate system, wherein the first axis is a horizontal axis and the occupied child nodes contain points represented by the point cloud data;
determining a horizontal plane position of the node, wherein the horizontal plane position indicates a position of the single plane that is perpendicular to the first axis of the coordinate system;
determining, from a plurality of contexts consisting of 8 contexts, a context for the horizontal plane position of the node; and
performing arithmetic encoding on a syntax element indicating the horizontal plane position using the determined context.

17. The method of claim 16, wherein the context is a first context, the plurality of contexts is a first plurality of contexts, and the method further comprises:
determining a first angle as a difference between a node origin angle and a laser angle, wherein:
the node origin angle is an angle, relative to the first axis of the coordinate system, of a line passing from an origin point of the coordinate system through an origin point of the node, and
the laser angle is an angle, relative to the first axis, of an applicable laser originating at the origin point of the coordinate system, wherein the applicable laser is a closest laser to the node;
determining a second angle as a difference between a node center angle and the laser angle, wherein the node center angle is an angle, relative to the first axis of the coordinate system, of a line passing from the origin point of the coordinate system through a center point of the node;
setting a context value to either 2 or 0 depending on whether both the first angle and the second angle are non-negative or both the first angle and the second angle are negative;
setting the first angle to an absolute value of the first angle;
setting the second angle to an absolute value of the second angle;
based on the first angle being greater than the second angle:
incrementing the azimuth angle context value by 1;
setting a temporary value to the first angle;
setting the first angle to the second angle; and
setting the second angle to the temporary value;
based on the second angle being greater than a shifted value, incrementing the azimuth angle context value by 4, wherein the shifted value is equal to the first angle left shifted by 1;
determining, from a second plurality of contexts, a second context based on the azimuth angle context value, wherein the second plurality of contexts consists of 8 contexts; and
performing arithmetic encoding on one or more bits of a point offset using the determined context, wherein the point offset is a first-axis coordinate of a point of the node relative to an origin point of the node.

18. The method of claim 16, wherein the node is a first node, the context is a first context, the plurality of contexts is a first plurality of contexts, the single plane is a first single plane, an angular planar coding mode and an azimuthal planar coding mode are disabled for a second node, and the method further comprises:
determining a context index that is equal to an axis index of the first axis regardless of occupancy of a neighbor node or Manhattan distance between a position of the node and a position of a most-recently node with a same axis position value for the first axis and regardless of whether tracking of closest nodes using a buffer is used in a process of coding a planar mode flag and plane position, wherein the axis position value for the first axis indicates 14 least significant bits of a first-axis coordinate of the node; and
performing arithmetic encoding on a planar flag for the first axis using a context indicated by the context index, wherein the planar flag indicates that child nodes of the second node form a second single plane perpendicular to the first axis of the coordinate system, and the context indicated by the context index is in a second plurality of contexts different from the first plurality of contexts.

19. A method for decoding point cloud data, the method comprising:
determining that occupied child nodes of a node form a single plane perpendicular to a first axis of a coordinate system, wherein the first axis is a horizontal axis and the occupied child nodes contain points represented by the point cloud data;
determining, from a plurality of contexts consisting of 8 contexts, a context for a horizontal plane position of the node, wherein the horizontal plane position indicates a position of the single plane that is perpendicular to the first axis of the coordinate system; and performing arithmetic decoding on a syntax element indicating the horizontal plane position using the determined context.

20. The method of claim 19, further comprising, based on determining that the occupied child nodes of the node form the plane perpendicular to the first axis, omitting decoding of child nodes of the node that are not in the plane perpendicular to the first axis.

21. The method of claim 19, wherein the context is a first context, the plurality of contexts is a first plurality of contexts, and method further comprises:
   determining a first angle as a difference between a node origin angle and a laser angle, wherein:
      the node origin angle is an angle, relative to the first axis of the coordinate system, of a line passing from the origin point of the coordinate system through an origin point of the node, and
      the laser angle is an angle, relative to the first axis, of an applicable laser originating at the origin point of the coordinate system, wherein the applicable laser is a closest laser to the node;
   determining a second angle as a difference between a node center angle and the laser angle, wherein the node center angle is an angle, relative to the first axis of the coordinate system, of a line passing from the origin point of the coordinate system through a center point of the node;
   setting an azimuth angle context value to either 2 or 0 depending on whether both the first angle and the second angle are non-negative or both the first angle and the second angle are negative;
   setting the first angle to an absolute value of the first angle;
   setting the second angle to an absolute value of the second angle;
   based on the first angle being greater than the second angle:
      incrementing the azimuth angle context value by 1;
      setting a temporary value to the first angle;
      setting the first angle to the second angle; and
      setting the second angle to the temporary value;
   based on the second angle being greater than a shifted value, incrementing the azimuth angle context value by 4, wherein the shifted value is equal to the first angle left shifted by 1;
   determining, from a second plurality of contexts, a second context based on the azimuth angle context value, wherein the second plurality of contexts consists of 8 contexts; and
   performing arithmetic decoding on one or more bits of a horizontal axis point offset using the determined context, wherein the point offset is a first-axis coordinate of a point of the node relative to an origin point of the node.

22. The method of claim 21, further comprising reconstructing the point cloud data, wherein reconstructing the point cloud data comprises determining a position of the point of the node based on the horizontal axis point offset.

23. The method of claim 19, wherein the node is a first node, the context is a first context, the plurality of contexts is a first plurality of contexts, the single plane is a first single plane, an angular planar coding mode and an azimuthal planar coding mode are disabled for a second node, and the method further comprises:
   determining a context index that is equal to an axis index of the first axis regardless of occupancy of a neighbor node or Manhattan distance between a position of the node and a position of a most-recently node with a same axis position value for the first axis and regardless of whether tracking of closest nodes using a buffer is used in a process of coding a planar mode flag and plane position, the axis position value for the first axis indicates 14 least significant bits of a first-axis coordinate of the node; and
   performing arithmetic decoding on a planar flag for the first axis using a context indicated by the context index, wherein the planar flag indicates that child nodes of the second node form a second single plane perpendicular to the first axis of the coordinate system, and the context indicated by the context index is in a second plurality of contexts different from the first plurality of contexts.

24. The device of claim 1, wherein the one or more processors are configured to, as part of determining the context for the horizontal plane position of the node:
   determine a first-axis position as a difference between a first-axis coordinate of an origin point of the node and a first-axis coordinate of an origin point of the coordinate system;
   determine a second-axis position as a difference between a second-axis coordinate of the origin point of the node and a second-axis coordinate of the origin point of the coordinate system;
   determine a first angle as a difference between a node origin angle and a laser angle, wherein:
      the node origin angle is an angle, relative to the first axis of the coordinate system, of a line passing from the origin point of the coordinate system through the origin point of the node, and the laser angle is an angle, relative to the first axis, of an applicable laser originating at the origin point of the coordinate system, wherein the applicable laser is a closest laser to the node;
   determine a second angle as a difference between a node center angle and the laser angle, wherein the node center angle is an angle, relative to the first axis of the coordinate system, of a line passing from the origin point of the coordinate system through a center point of the node;
   set an azimuth angle context value to either 2 or 0 depending on whether both the first angle and the second angle are non-negative or both the first angle and the second angle are negative;
   set the first angle to an absolute value of the first angle;
   set the second angle to an absolute value of the second angle;
   based on the first angle being greater than the second angle:
   increment the azimuth angle context value by 1;
   set a temporary value to the first angle;
   set the first angle to the second angle; and
   set the second angle to the temporary value;
   based on the second angle being greater than a shifted value, increment the azimuth angle context value by 4, wherein the shifted value is equal to the first angle left shifted by 2;
   based on an absolute value of the first-axis position being less than or equal to an absolute value of the second-axis position, set a first-axis azimuth angle context value to the context angle value;
   based on the absolute value of the first-axis position being greater than the absolute value of the second-axis position, set a second-axis azimuth angle context value to the context angle value; and determine the context based on the first-axis azimuth angle context value or the second-axis azimuth context value.

25. The device of claim 1, wherein the context is a first context, the plurality of contexts is a first plurality of contexts, and the one or more processors are further configured to:
  determine a first angle as a difference between a node origin angle and a laser angle, wherein:
  the node origin angle is an angle, relative to the first axis of the coordinate system, of a line passing from an origin point of the coordinate system through an origin point of the node, and the laser angle is an angle, relative to the first axis, of an applicable laser originating at the origin point of the coordinate system, wherein the applicable laser is a closest laser to the node;
  determine a second angle as a difference between a node center angle and the laser angle, wherein the node center angle is an angle, relative to the first axis of the coordinate system, of a line passing from the origin point of the coordinate system through a center point of the node;
  set a context value to either 2 or 0 depending on whether both the first angle and the second angle are non-negative or both the first angle and the second angle are negative;
  set the first angle to an absolute value of the first angle;
  set the second angle to an absolute value of the second angle;
  based on the first angle being greater than the second angle:
  increment the azimuth angle context value by 1;
  set a temporary value to the first angle;
  set the first angle to the second angle; and
  set the second angle to the temporary value;
  based on the second angle being greater than a shifted value, increment the azimuth angle context value by 4, wherein the shifted value is equal to the first angle left shifted by 1;
  determine, from a second plurality of contexts, a second context based on the azimuth angle context value, wherein the second plurality of contexts consists of 8 contexts; and
  perform arithmetic encoding on one or more bits of a point offset using the determined context, wherein the point offset is a first-axis coordinate of a point of the node relative to the origin point of the node.

26. The device of claim 8, wherein the one or more processors are configured to, as part of determining the context for the horizontal plane position of the node:
  determine a first-axis position as a difference between a first-axis coordinate of an origin point of the node and a first-axis coordinate of an origin point of the coordinate system;
  determine a second-axis position as a difference between a second-axis coordinate of the origin point of the node and a second-axis coordinate of the origin point of the coordinate system;
  determine a first angle as a difference between a node origin angle and a laser angle, wherein:
  the node origin angle is an angle, relative to the first axis of the coordinate system, of a line passing from the origin point of the coordinate system through the origin point of the node, and
  the laser angle is an angle, relative to the first axis, of an applicable laser originating at the origin point of the coordinate system, wherein the applicable laser is a closest laser to the node;
  determine a second angle as a difference between a node center angle and the laser angle, wherein the node center angle is an angle, relative to the first axis of the coordinate system, of a line passing from the origin point of the coordinate system through a center point of the node;
  set an azimuth angle context value to either 2 or 0 depending on whether both the first angle and the second angle are non-negative or both the first angle and the second angle are negative;
  set the first angle to an absolute value of the first angle;
  set the second angle to an absolute value of the second angle;
  based on the first angle being greater than the second angle:
  increment the azimuth angle context value by 1;
  set a temporary value to the first angle;
  set the first angle to the second angle; and
  set the second angle to the temporary value;
  based on the second angle being greater than a shifted value, increment the azimuth angle context value by 4, wherein the shifted value is equal to the first angle left shifted by 2;
  based on an absolute value of the first-axis position being less than or equal to an absolute value of the second-axis position, set a first-axis azimuth angle context value to the context angle value;
  based on the absolute value of the first-axis position being greater than the absolute value of the second-axis position, set a second-axis azimuth angle context value to the context angle value;
  determine the context based on the first-axis azimuth angle context value or the second-axis azimuth context value.

27. The device of claim 8, wherein the context is a first context, the plurality of contexts is a first plurality of contexts, and the one or more processors are further configured to:
  determine a first angle as a difference between a node origin angle and a laser angle, wherein:
  the node origin angle is an angle, relative to the first axis of the coordinate system, of a line passing from an origin point of the coordinate system through an origin point of the node, and
  the laser angle is an angle, relative to the first axis, of an applicable laser originating at the origin point of the coordinate system, wherein the applicable laser is a closest laser to the node;
  determine a second angle as a difference between a node center angle and the laser angle, wherein the node center angle is an angle, relative to the first axis of the coordinate system, of a line passing from the origin point of the coordinate system through a center point of the node;
  set an azimuth angle context value to either 2 or 0 depending on whether both the first angle and the second angle are non-negative or both the first angle and the second angle are negative;
  set the first angle to an absolute value of the first angle;
  set the second angle to an absolute value of the second angle;
  based on the first angle being greater than the second angle:
  increment the azimuth angle context value by 1;
  set a temporary value to the first angle;
  set the first angle to the second angle; and
  set the second angle to the temporary value;

based on the second angle being greater than a shifted value, increment the azimuth angle context value by 4, wherein the shifted value is equal to the first angle left shifted by 1;

determine, from a second plurality of contexts, a second context based on the azimuth angle context value, wherein the second plurality of contexts consists of 8 contexts; and perform arithmetic decoding on one or more bits of a horizontal axis point offset using the determined context, wherein the point offset is a first-axis coordinate of a point of the node relative to the origin point of the node.

28. The method of claim 16, wherein determining the context for the horizontal plane position of the node comprises:

determining a first-axis position as a difference between a first-axis coordinate of an origin point of the node and a first-axis coordinate of an origin point of the coordinate system;

determining a second-axis position as a difference between a second-axis coordinate of the origin point of the node and a second-axis coordinate of the origin point of the coordinate system;

determining a first angle as a difference between a node origin angle and a laser angle, wherein:

the node origin angle is an angle, relative to the first axis of the coordinate system, of a line passing from the origin point of the coordinate system through an origin point of the node, and the laser angle is an angle, relative to the first axis, of an applicable laser originating at the origin point of the coordinate system, wherein the applicable laser is a closest laser to the node;

determining a second angle as a difference between a node center angle and the laser angle, wherein the node center angle is an angle, relative to the first axis of the coordinate system, of a line passing from the origin point of the coordinate system through a center point of the node;

setting an azimuth angle context value to either 2 or 0 depending on whether both the first angle and the second angle are non-negative or both the first angle and the second angle are negative;

setting the first angle to an absolute value of the first angle;

setting the second angle to an absolute value of the second angle;

based on the first angle being greater than the second angle:

incrementing the azimuth angle context value by 1;
setting a temporary value to the first angle;
setting the first angle to the second angle; and
setting the second angle to the temporary value;

based on the second angle being greater than a shifted value, increment the azimuth angle context value by 4, wherein the shifted value is equal to the first angle left shifted by 2;

based on an absolute value of the first-axis position being less than or equal to an absolute value of the second-axis position, setting a first-axis azimuth angle context value to the context angle value;

based on the absolute value of the first-axis position being greater than the absolute value of the second-axis position, setting a second-axis azimuth angle context value to the context angle value; and determining the context based on the first-axis azimuth angle context value or the second-axis azimuth angle context value.

29. The method of claim 19, wherein determining the context for the horizontal plane position of the node comprises:

determining a first-axis position as a difference between a first-axis coordinate of an origin point of the node and a first-axis coordinate of an origin point of the coordinate system;

determining a second-axis position as a difference between a second-axis coordinate of the origin point of the node and a second-axis coordinate of the origin point of the coordinate system;

determining a first angle as a difference between a node origin angle and a laser angle, wherein:

the node origin angle is an angle, relative to the first axis of the coordinate system, of a line passing from the origin point of the coordinate system through an origin point of the node, and the laser angle is an angle, relative to the first axis, of an applicable laser originating at the origin c point of the coordinate system, wherein the applicable laser is a closest laser to the node;

determining a second angle as a difference between a node center angle and the laser angle, wherein the node center angle is an angle, relative to the first axis of the coordinate system, of a line passing from the origin point of the coordinate system through a center point of the node;

setting an azimuth angle context value to either 2 or 0 depending on whether both the first angle and the second angle are non-negative or both the first angle and the second angle are negative;

setting the first angle to an absolute value of the first angle;

setting the second angle to an absolute value of the second angle;

based on the first angle being greater than the second angle:

incrementing the azimuth angle context value by 1;
setting a temporary value to the first angle;
setting the first angle to the second angle; and
setting the second angle to the temporary value;

based on the second angle being greater than a shifted value, incrementing the azimuth angle context value by 4, wherein the shifted value is equal to the first angle left shifted by 2;

based on an absolute value of the first-axis position being less than or equal to an absolute value of the second-axis position, setting a first-axis azimuth angle context value to the context angle value;

based on the absolute value of the first-axis position being greater than the absolute value of the second-axis position, setting a second-axis azimuth angle context value to the context angle value;

determining the context based on the first-axis azimuth angle context value or the second-axis azimuth context value.

* * * * *